(12) United States Patent
Fang

(10) Patent No.: US 12,094,022 B2
(45) Date of Patent: Sep. 17, 2024

(54) SYSTEMS AND METHODS FOR DISASTER CONTROL

(71) Applicant: ZHEJIANG DAHUA TECHNOLOGY CO., LTD., Zhejiang (CN)

(72) Inventor: Yongjun Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 251 days.

(21) Appl. No.: 17/648,804

(22) Filed: Jan. 24, 2022

(65) Prior Publication Data

US 2022/0148115 A1    May 12, 2022

Related U.S. Application Data

(63) Continuation of application No. PCT/CN2019/129796, filed on Dec. 30, 2019.

(30) Foreign Application Priority Data

Jul. 26, 2019    (CN) .......................... 201910685001.7

(51) Int. Cl.
*H04W 4/90*      (2018.01)
*B64C 39/02*    (2023.01)
(Continued)

(52) U.S. Cl.
CPC ......... *G06Q 50/265* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 6,639,625 B1 * 10/2003 Ishida .................. H04N 1/0432
348/E5.053
2009/0267952 A1 * 10/2009 Yan .................. H04N 21/43637
345/520

(Continued)

FOREIGN PATENT DOCUMENTS

CN        102006574 A        4/2011
CN        105550824 A        5/2016
(Continued)

OTHER PUBLICATIONS

International Search Report in PCT/CN2019/129796 mailed on Mar. 30, 2020, 4 pages.

(Continued)

*Primary Examiner* — Eileen M Adams
(74) *Attorney, Agent, or Firm* — METIS IP LLC

(57) ABSTRACT

The present disclosure is related to systems and methods for disaster control. The method includes obtaining an alert message including information associated with a disaster in a target area. The method includes sending a first shooting instruction to at least one camera device to capture first image data associated with the target area. The method includes obtaining a plan for controlling the disaster from at least one processor. The first image data may be transmitted to the at least one processor through a communication network. The plan may be determined based on the information associated with the disaster and the first image data.

17 Claims, 13 Drawing Sheets

(51) Int. Cl.
| | |
|---|---|
| *B64D 47/08* | (2006.01) |
| *G06Q 50/26* | (2012.01) |
| *G06V 20/17* | (2022.01) |
| *G06V 20/52* | (2022.01) |
| *G08B 21/10* | (2006.01) |
| *H04N 23/698* | (2023.01) |
| *H04W 4/40* | (2018.01) |
| *B64U 101/30* | (2023.01) |

(52) U.S. Cl.
CPC .............. *G06V 20/17* (2022.01); *G06V 20/52* (2022.01); *G08B 21/10* (2013.01); *H04N 23/698* (2023.01); *H04W 4/40* (2018.02); *H04W 4/90* (2018.02); *B64U 2101/30* (2023.01); *B64U 2201/10* (2023.01)

(56) References Cited

U.S. PATENT DOCUMENTS

| | | | | |
|---|---|---|---|---|
| 2017/0039439 | A1* | 2/2017 | Kim | G06V 20/586 |
| 2017/0295327 | A1 | 10/2017 | Menon | |
| 2018/0009528 | A1 | 1/2018 | Zerick et al. | |
| 2018/0050800 | A1 | 2/2018 | Boykin et al. | |
| 2018/0181095 | A1* | 6/2018 | Funk | G05B 19/042 |
| 2018/0278464 | A1 | 9/2018 | Donovan et al. | |
| 2019/0149558 | A1* | 5/2019 | Phan | H04W 12/126 |
| | | | | 713/164 |
| 2019/0392211 | A1* | 12/2019 | Hartman | G06V 20/20 |
| 2020/0134845 | A1* | 4/2020 | Wang | G06T 7/001 |
| 2020/0288532 | A1* | 9/2020 | Wang | G06T 19/00 |

FOREIGN PATENT DOCUMENTS

| | | |
|---|---|---|
| CN | 107272536 A | 10/2017 |
| CN | 108521565 A | 9/2018 |
| CN | 207850428 U | 9/2018 |
| CN | 109862626 A | 6/2019 |
| JP | 2017146702 A | 8/2017 |
| KR | 100715305 B1 | 5/2007 |
| WO | 2017059395 A1 | 4/2017 |
| WO | 2021017403 A1 | 2/2021 |

OTHER PUBLICATIONS

Written Opinion in PCT/CN2019/129796 mailed on Mar. 30, 2020, 6 pages.
First Office Action in Chinese Application No. 201910685001.7 mailed on Mar. 9, 2020, 19 pages.
The Second Office Action in Chinese Application No. 201910685001.7 mailed on Sep. 11, 2020, 23 pages.
Wu, Hanhui, Study on the Advanced Technology of Forecast and Early Warning for Debris Flow and its Application in Demonstration Area, Basic Science of Full Text Database of Chinese Doctoral Dissertations, 2015, Part One, 80 pages.
Wu, Hanhui, Study on the Advanced Technology of Forecast and Early Warning for Debris Flow and its Application in Demonstration Area, Basic Science of Full Text Database of Chinese Doctoral Dissertations, 2015, Part Two, 89 pages.
The Extended European Search Report in European Application No. 19939749.8 mailed on Jun. 22, 2022, 7 pages.

* cited by examiner

800

| 810 | Obtaining first image data associated with a target area from at least one camera device, wherein the first image data is captured based on a first shooting instruction, and the first shooting instruction is generated based on an alert message including first information associated with a disaster in the target area |

| 820 | Determining, based on the first image data and the first information associated with the disaster in the target area, a plan for controlling the disaster |

| 830 | Obtaining second image data from the at least one camera device, wherein the second image data is captured based on a second shooting instruction |

| 840 | Determining, based on the first image data and the second image data, an updated plan for controlling the disaster |

FIG. 8

SYSTEMS AND METHODS FOR DISASTER CONTROL

CROSS-REFERENCE TO RELATED APPLICATIONS

This application is a continuation of International Application No. PCT/CN2019/129796 field on Dec. 30, 2019, which claims priority of Chinese Patent Application No. 201910685001.7, filed on Jul. 26, 2019, the contents of each of which are incorporated herein by reference.

TECHNICAL FIELD

This present disclosure generally relates to communication technology, and in particular, to systems and methods for disaster control.

BACKGROUND

Disasters, such as flooding, fires, earthquakes, hurricanes, mudslides, occur across the world every day. For example, with the rapid development of industry, the probability of fire accidents or explosions caused by flammable, explosive and/or toxic chemicals is increasing. An effective plan for controlling a disaster relies on accurate and rapid acquisition of information associated with the disaster. However, current plan determination process is usually slow, inaccurate, and/or rely on limited information associated with the disaster (e.g., an alert message), which may result in an untimely and improper rescue. Furthermore, during the rescue, the degree of human intervention is high, which may lead to dangerous accidents. After the rescue is completed, rescuers (e.g., firefighters) in fatigue still need to check a rescue equipment, which is time-consuming and laborious. Thus, it is desirable to develop effective systems and methods for disaster control.

SUMMARY

According to an aspect of the present disclosure, a method for disaster control implemented on a control device may include one or more of the following operations performed by at least one processor. The method may include obtaining an alert message including information associated with a disaster in a target area. The method may include sending a first shooting instruction to at least one camera device to capture first image data associated with the target area. The method may include obtaining a plan for controlling the disaster from at least one processor. The first image data may be transmitted to the at least one processor through a communication network. The plan may be determined, by the at least one processor, based on the information associated with the disaster and the first image data.

In some embodiments, the first shooting instruction may include a first instruction and a second instruction. The first image data may include second image data and third image data. The at least one camera device may include a first camera device and a second camera device. The first camera device may be an unmanned aerial vehicle with a camera. The method may include sending, to the first camera device, the first instruction to direct the first camera device to the target area or an adjacent area to capture the second image data. The method may include sending, to the second camera device, the second instruction to capture the third image data. The second camera device may be located in the target area or the adjacent area.

In some embodiments, prior to sending the first instruction to the first camera device, the method may include sending, to a third camera device, a second shooting instruction to direct the third camera device to return fourth image data associated with the target area. The fourth images data may be obtained by the third camera device within a predetermined time period. The third camera device may be located in the target area or the adjacent area.

In some embodiments, the second image data may include fifth image data and sixth image data. The target area may include a plurality of sub-areas. The method may include, in response to the first instruction, generating, by the first camera device, the fifth image data by performing a panoramic shooting on the target area. The fifth image data may be used to construct a map of the target area. The method may include generating, by the first camera device, the sixth image data associated with at least one sub-area of the plurality of sub-areas.

In some embodiments, the method may include performing, by the first camera device, a shallow compression operation on the first image data to generate compressed first image data. The method may include transmitting, by the first camera device, the compressed first image data to the control device to direct the control device to display the first image data.

In some embodiments, the method may include obtaining a first route for entering the target area from the at least one processor. The method may include obtaining a second route for leaving the target area from the at least one processor.

In some embodiments, the method may include, in response to obtaining the plan for controlling the disaster from at least one processor, sending a third shooting instruction to the at least one camera device to capture seventh image data associated with at least one sub-area of the target area. The method may include obtaining an updated plan for controlling the disaster from the at least one processor. The seventh image data may be transmitted to the at least one processor. The updated plan may be determined, by the at least one processor, based on the first image data and the seventh image data.

In some embodiments, the seventh image data may include eighth image data, ninth image data, and tenth image data. The at least one camera device may further include a fourth camera device and a fifth camera device. The fourth camera device may be a smart robot with a camera. The method may include sending, to the first camera device, the third shooting instruction to capture the eighth image data associated with the target area. The method may include sending, to the fourth camera device, the third shooting instruction to capture the ninth image data associated with the target area. The method may include sending, to the fifth camera device associated with a user, the third shooting instruction to capture the tenth image data associated with the target area.

In some embodiments, the method may include, in response to sending the third shooting instruction to the first camera device, performing, by the first camera device, a shallow compression operation on the eighth image data to generate compressed eighth image data. The method may include transmitting, by the first camera device, the compressed eighth image data to the control device. The compressed eighth image data may be displayed on the control device.

In some embodiments, the method may include, in response to sending the third shooting instruction to the fourth camera device, performing, by the fourth camera device, a shallow compression operation on the ninth image data to generate compressed ninth image data. The method may include transmitting, by the fourth camera device, the compressed ninth image data to the control device. The compressed ninth image data may be displayed on the control device.

In some embodiments, the method may include obtaining sound information associated with an explosion from the fifth camera device associated with the user. The method may include obtaining an explosion location from the at least one processor. The explosion location may be determined, by the at least one processor, based on the sound information and a location of the fifth camera device.

In some embodiments, the method may include determining a location of at least one equipment associated with the disaster according to an Internet of Things (IoT) positioning technology.

In some embodiments, the at least one equipment may include at least one of the at least one camera device, or an equipment used to control the disaster.

In some embodiments, the communication network between the at least two of the control device, the at least one processor, and the at least one camera device, may be a 5G network.

In some embodiments, the method may include transmitting, by the at least one camera device, the first image data to the control device using a 5G network.

In some embodiments, the method may include performing, by the at least one camera device, a deep compression operation on the first image data to generate compressed first image data. The method may include transmitting, by the at least one camera device, the compressed first image data to the control device.

In some embodiments, the method may include transmitting, by the at least one processor, the plan to the control device using a 5G network.

In some embodiments, the at least one camera may include a 5G camera device.

According to an aspect of the present disclosure, a method for disaster control implemented on a control device may include one or more of the following operations performed by at least one processor. The method may include obtaining first image data associated with a target area from at least one camera device. The first image data may be captured based on a first shooting instruction. The first shooting instruction may be generated based on an alert message including first information associated with a disaster in the target area. The method may include determining, based on the first image data and the first information associated with the disaster in the target area, a plan for controlling the disaster.

In some embodiments, the method may include determining, based on the first image data and the first information associated with the disaster in the target area, a first route for entering the target area. The method may include determining, based on the first image data and the first information associated with the disaster in the target area, a second route for leaving the target area.

In some embodiments, the method may include determining, based on the first image data, second information associated with the disaster.

In some embodiments, the target area may include a plurality of sub-areas. The second information associated with the disaster in the target area may include at least one of a severity of the disaster associated with each sub-area, a disaster development trend of the each sub-area, an entrance of the target area, an exit of the target area, or an available route in the target area.

In some embodiments, the method may include selecting the first route from a plurality of available routes in the target area. The first route may include the entrance of the target area, the exit of the target area, at least one first sub-area, and at least one of a second sub-area or a third sub-area. The disaster associated with the at least one of the second sub-area or the third sub-area may be controlled in the first route. The severity of the disaster associated with the at least one first sub-area may be less than a first predetermined threshold. The disaster development trend of the second sub-area may be greater than a second predetermined threshold. A severity of the disaster severity associated with the third sub-area may be greater than the first predetermined threshold.

In some embodiments, the method may include selecting the second route from the plurality of available routes in the target area. The second route may include the entrance of the target area, the exit of the target area, and at least one fourth sub-area. A severity of the disaster associated with the at least one fourth sub-area may be less than the first predetermined threshold.

In some embodiments, the method may include, in response to determining the plan for controlling the disaster, obtaining second image data associated with at least one sub-area of the target area from the at least one camera device. The second image data may be captured based on a third instruction. The method may include determining, based on the first image data and the second image data, an updated plan for controlling the disaster.

According to another aspect of the present disclosure, a system for disaster control may include a first obtaining module configured to obtain an alert message including information associated with a disaster in a target area, a transmission module configured to send a first shooting instruction to at least one camera device to capture first image data associated with the target area, and a second obtaining module configured to obtain a plan for controlling the disaster from at least one processor. The first image data may be transmitted to the at least one processor through a communication network. The plan may be determined, by the at least one processor, based on the information associated with the disaster and the first image data.

In some embodiments, the first shooting instruction may include a first instruction and a second instruction. The first image data may include second image data and third image data. The at least one camera device may include a first camera device and a second camera device. The first camera device may be an unmanned aerial vehicle with a camera. The transmission module may further be configured to send, to the first camera device, the first instruction to direct the first camera device to the target area or an adjacent area to capture the second image data. The transmission module may further be configured to send, to the second camera device, the second instruction to capture the third image data. The second camera device may be located in the target area or the adjacent area.

According to another aspect of the present disclosure, a system for disaster control may include an obtaining module and a determination module. The obtaining module may be configured to obtain first image data associated with a target area from at least one camera device. The first image data may be captured based on a first shooting instruction. The first shooting instruction may be generated based on an alert message including first information associated with a disaster in the target area. The determination module may be configured to determine, based on the first image data and the first information associated with the disaster in the target area, a plan for controlling the disaster.

In some embodiments, the determination module may further be configured to determine, based on the first image data and the first information associated with the disaster in the target area, a first route for entering the target area. The determination module may further be configured to determine, based on the first image data and the first information associated with the disaster in the target area, a second route for leaving the target area.

According to another aspect of the present disclosure, a non-transitory computer-readable storage medium may store instructions. When executing the instructions, at least one processor of a system may cause the system to perform a method for disaster control.

According to another aspect of the present disclosure, an electronic device may include at least one computer-readable storage medium storing a set of instructions, and at least one processor configured to communicate with the at least one computer-readable storage medium. When executing the set of instructions, the at least one processor may be directed to perform a method for disaster control.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for disaster control according to some embodiments of the present disclosure;

DETAILED DESCRIPTION

Figure 1:
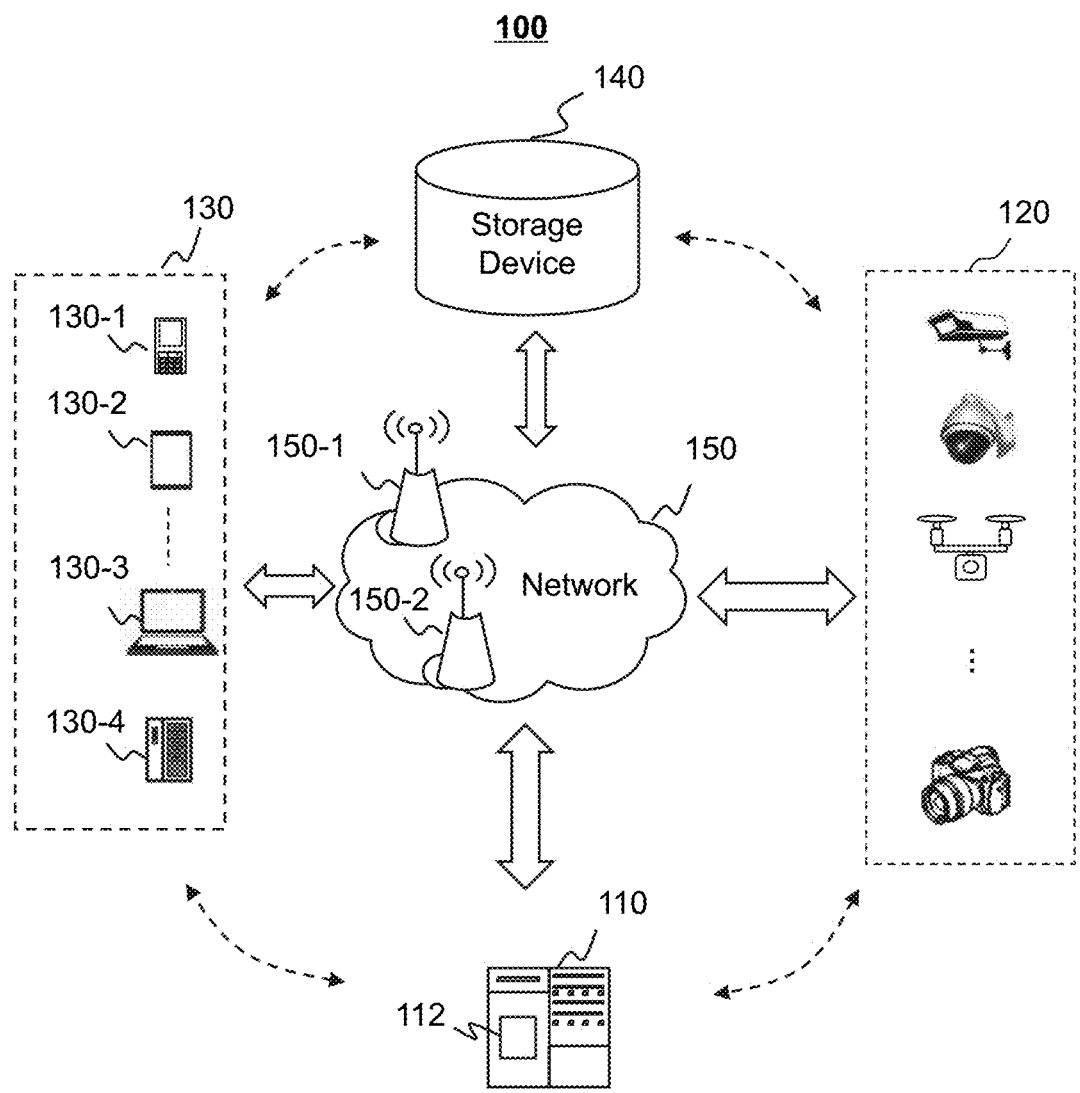
FIG. 1 is a schematic diagram illustrating an exemplary disaster control system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for disaster control. According to some embodiments of the present disclosure, an alert message n information associated with a disaster in a target area may be obtained. A first shooting instruction may be sent to at least one camera device (e.g., a 5G camera, an unmanned aerial vehicle, a surveillance camera, etc.) to capture first image data associated with the target area. A plan for controlling the disaster may be obtained from at least one processor (e.g., the processing engine 112). The first image data may be transmitted to the at least one processor through a communication network (e.g., a 5G network). The plan may be determined, by the at least one processor, based on the information associated with the disaster and the first image data.

Accordingly, after the alert message is obtained, the at least one camera device (e.g., the camera device 120) may capture first image data associated with the target area, which may ensure that the acquired information associated with the disaster is timely and comprehensive. Therefore, the plan for controlling the disaster may be determined based on the first image data quickly and efficiently. The efficiency of the disaster control process may be improved, the casualties may be reduced and the safety of the property may be ensured.

FIG. 1 is a schematic diagram illustrating an exemplary disaster control system 100 according to some embodiments of the present disclosure. In some embodiments, the disaster control system 100 may include a server 110, a camera device 120, a control device 130, a storage device 140, and a network 150. The components of the disaster control system 100 may be connected to each other in one or more of various ways. For example, the server 110 may be connected to the control device 130 through the network 150, or connected to the control device 130 directly as illustrated by the bidirectional dotted arrow connecting the server 110 and the control device 130 in FIG. 1. As another example, the camera device 120 may be connected to the server 110 through the network 150, or connected to the server 110 directly as illustrated by the bidirectional dotted arrow connecting the camera device 120 and the server 110 in FIG. 1. As still another example, the control device 130 may be connected to the storage device 140 through the network 150, or connected to the storage device 140 directly as illustrated by the bidirectional dotted arrow connecting the control device 130 and the storage device 140 in FIG. 1. As still another example, the camera device 120 may be connected to the storage device 140 through the network 150, or connected to the storage device 140 directly as illustrated by the bidirectional dotted arrow connecting the camera device 120 and the storage device 140 in FIG. 1.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the control device 130, the storage device 140, and/or the camera device 120 via the network 150. As another example, the server 110 may be directly connected to the camera device 120, the control device 130, and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may be implemented on an edge computing platform. As used herein, edge computing may refer to a distributed computing paradigm which brings computation and data storage close to the location where it is needed, to improve response times and save bandwidth. In some embodiments, edge computing may be used to move the computation away from data centers towards the edge of the network, exploit smart objects, mobile phones or network gateways to perform tasks, and provide services on behalf of the cloud.

In some embodiments, the server 110 may include a processing engine 112. The processing engine 112 may process information and/or data to perform one or more functions described in the present disclosure. For example, the processing engine 112 may obtain first image data associated with a target area from at least one camera device (e.g., the camera device 120). As another example, the processing engine 112 may determine, based on first image data and first information associated with a disaster in a target area, a plan for controlling the disaster. As still another example, the processing engine 112 may obtain second image data from at least one camera device (e.g., the camera device 120). As still another example, the processing engine 112 may determine, based on first image data and second image data associated with a disaster, an updated plan for controlling the disaster. As used herein, image data (e.g., the first image data, the second image data) may be a still image, a video, a streaming video, or a video frame obtained from a video. The image data may be extracted from a three-dimensional (3D) image or a two-dimensional (2D) image. More descriptions of information associated with the disaster (e.g., the first information) and the plan for controlling the disaster may be found elsewhere in the present disclosure (e.g., FIG. 6 and descriptions thereof). In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 150 to communicate with one or more components (e.g., the control device 130, the storage device 140, and/or the camera device 120) of the disaster control system 100. In some embodiments, the server 110 may be directly connected to or communicate with one or more components (e.g., the control device 130, the storage device 140, and/or the camera device 120) of the disaster control system 100.

The camera device 120 may be configured to acquire image data. In some embodiments, the camera device 120 may be a 5G camera or a 4G camera. For example, the camera device 120 may include a 5G communication module and/or a 4G communication module. As used herein, a 5G camera may refer to a camera device that communicates based on a 5G communication network, or a camera device that performs data transmission via the 5G communication network. In some embodiments, the camera device 120 may include a spherical camera, a hemispherical camera, a rifle camera, etc. In some embodiments, the camera device 120 may include a black-white camera, a color camera, an infrared camera, an X-ray camera, etc. In some embodiments, the camera device 120 may include a digital camera, an analog camera, etc. In some embodiments, the camera device 120 may include a monocular camera, a binocular camera, a multi-camera, etc.

In some embodiments, the camera device 120 may be an unmanned aerial vehicle (UAV). The UAV (also referred to as a drone) may refer to an aircraft without a human pilot onboard and a type of unmanned vehicle. In some embodiments, the camera device 120 may be a smart robot. For example, the camera device 120 may be a firefighting robot. In some embodiments, the camera device 120 may be a surveillance camera configured to monitor an area (e.g., a target area).

In some embodiments, the camera device 120 (e.g., the UAV, the smart robot) may be equipped with one or more sensors configured to detect information associated with the camera device 120. The one or more sensors may include a global position system (GPS) device, an acceleration sensor (e.g., a piezoelectric sensor), a velocity sensor (e.g., a Hall sensor), a distance sensor (e.g., a radar, a LIDAR, an infrared sensor), a steering angle sensor (e.g., a tilt sensor), a traction-related sensor (e.g., a force sensor), an inertial measurement unit (IMU) sensor, a geomagnetic sensor, a pressure sensor, a temperature sensor, or the like. In some embodiments, the information associated with the camera device 120 may include road condition information (e.g., a road width, a road length), map information, a state of the camera device 120 during driving (or flight) (e.g., a location of the camera device 120, a velocity of the camera device 120, an acceleration of the camera device 120, a driving path (or a flight path) of the camera device 120, or the like, or any combination thereof.

In some embodiments, the camera device 120 may be mounted on one or more components carried by a subject. In some embodiments, the subject may be a user (e.g., a firefighter) using a disaster control service via the disaster control system 100. For example, the camera devices 120 may be mounted on a rescue gear of a firefighter to capture image data associated with the surrounding environment. As another example, the camera device 120 may be attached to one or more portions (e.g., a wrist or an ankle) of a firefighter to capture image data associated with the surrounding environment.

In some embodiments, the camera device 120 may further include at least one local server (also referred to as a device processor) integrated into the camera device 120. For example, the local server may be a computing device (e.g., an on-board computer) installed in the camera device 120. In some embodiments, the camera device 120 may generate data associated with the disaster information, and/or data associated with the performance or operation of the camera device 120. In some embodiments, the camera device 120 (i.e., the local server of the camera device 120) may process the generated data to perform one or more functions described in the present disclosure. For example, the camera device 120 may process (e.g., compress) image data associated with a target area. As another example, the camera device 120 may transmit image data associated with a target area to one or more components (e.g., the processing engine 112, the control device 130) of the disaster control system 100.

In some embodiments, the camera device 120 may be remotely controlled based on an instruction provided by a user via a control device (e.g., the control device 130). In some embodiments, the camera device 120 may be autonomously controlled by the computing device (e.g., an on-board computer) installed in the camera device 120.

In some embodiments, the control device 130 (also referred to as a terminal device) may be configured to control the camera device 120 based on an instruction provided by a user (e.g., a director, a rescuer) of the disaster control system 100. In some embodiments, one control device 130 may control one or more camera devices 120. In some embodiments, the control device 130 may be located in a command center. In some embodiments, the control devices 130 may include a mobile device 130-1, a tablet computer 130-2, a laptop computer 130-3, a telephone 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

In some embodiments, the control device 130 may further include at least one local server (also referred to as a device processor) integrated into the control device 130. For example, the local server may be a computing device (e.g., an on-board computer) installed in the control device 130. In some embodiments, the control device 130 may generate data associated with the disaster information, and/or data associated with the performance or operation of the control device 130. In some embodiments, the control device 130 (i.e., the local server of the control device 130) may process the generated data to perform one or more functions described in the present disclosure. For example, the control device 130 may obtain an alert message including information associated with a disaster in a target area. As another example, the control device 130 may send a first shooting instruction to at least one camera device (e.g., the camera device 120) to capture first image data associated with a target area. As still another example, the control device 130 may obtain a plan for controlling a disaster from at least one processor (e.g., the processing engine 112).

The storage device 140 may store data and/or instructions. In some embodiments, the storage device 140 may store data obtained from the control device 130, the camera device 120, the processing engine 112, and/or an external storage device. For example, the storage device 140 may store image data obtained from the camera device 120. As another example, the storage device 140 may store a (updated) plan for controlling a disaster in a target area determined by the processing engine 112. In some embodiments, the storage device 140 may store data and/or instructions that the server 110 may execute or use to perform exemplary methods described in the present disclosure. For example, the storage device 140 may store instructions that the processing engine 112 may execute or use to determine an (updated) plan for controlling a disaster in a target area.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 110, the control device 130, and/or the camera device 120) of the disaster control system 100. One or more components of the disaster control system 100 may access the data or instructions stored in the storage device 140 via the network 150. In some embodiments, the storage device 140 may be directly connected to or communicate with one or more components (e.g., the server 110, the control device 130, and/or the camera device 120) of the disaster control system 100. In some embodiments, the storage device 140 may be part of the server 110.

The network 150 may facilitate the exchange of information and/or data. In some embodiments, one or more components (e.g., the server 110, the control device 130, the storage device 140, or the camera device 120) of the disaster control system 100 may send information and/or data to other components of the disaster control system 100 via the network 150. For example, the server 110 and/or the control device 130 may obtain/acquire image data from one or more camera devices 120 via the network 150. As another example, the control device 130 may obtain an (updated) plan for controlling a disaster from the server 110 via the network 150. In some embodiments, the network 150 may be any type of wired or wireless network, or combination thereof. Merely by way of example, the network 150 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the disaster control system 100 may be connected to the network 150 to exchange data and/or information. In some embodiments, the network 150 may be a 5G network.

It should be noted that the disaster control system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the disaster control system 100 may further include a database, an information source, etc. As another example, the disaster control system 100 may be implemented on other devices to realize similar or different functions.

In some embodiments, one or more components (e.g., the camera device 120, the control device 130) of the disaster control system 100 may be configured with one or more communication modules (e.g., a mesh networking module). As used herein, a mesh network may refer to a local network topology in which the infrastructure nodes (i.e. bridges, switches, and other infrastructure devices) connect directly, dynamically and non-hierarchically to as many other nodes as possible and cooperate with one another to efficiently route data from/to clients. When an abnormality occurs in the network 150 (e.g., the 5G network) (e.g., the network is a failure, a technical problem occurs in the network), the use of the mesh network may ensure that data transmission between components of the disaster control system 100 is achieved.

Figure 2:
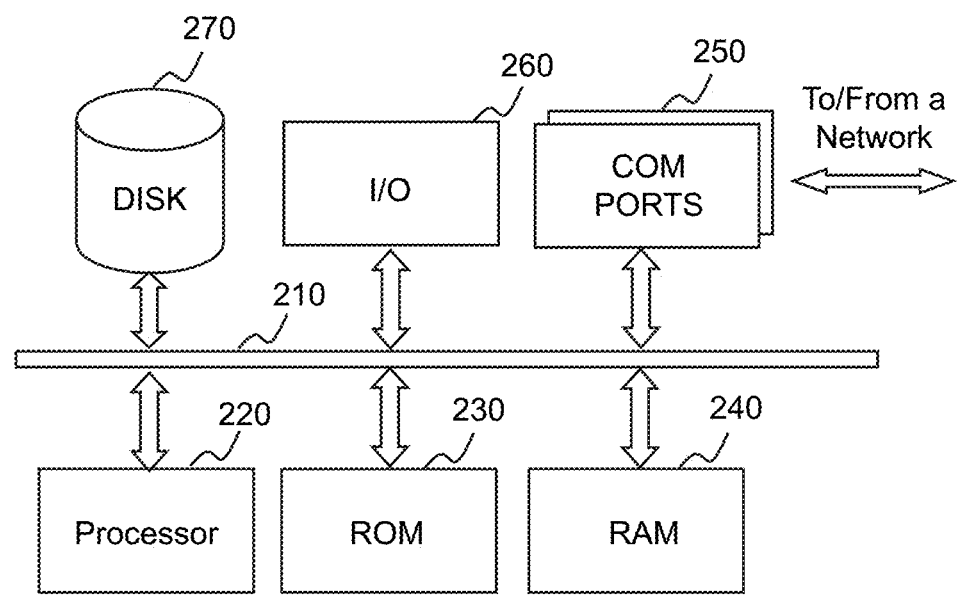
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110, the control device 130 may be implemented on the computing device 200. For example, the processing engine 112 may be implemented on the computing device 200 and configured to perform functions of the processing engine 112 disclosed in this disclosure.

The computing device 200 may be used to implement any component of the disaster control system 100 as described herein. For example, the processing engine 112 may be implemented on the computing device 200, via its hardware, software program, firmware, or a combination thereof. Although only one such computer is shown, for convenience, the computer functions relating to the disaster control as described herein may be implemented in a distributed fashion on a number of similar platforms to distribute the processing load.

The computing device 200 may include COM ports 250 connected to and from a network connected thereto to facilitate data communications. The computing device 200 may also include a processor 220, in the form of one or more, e.g., logic circuits, for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read only memory (ROM) 230, or a random access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is described in FIG. 2. Multiple processors are also contemplated, thus operations and/or steps performed by one processor as described in the present disclosure may also be jointly or separately performed by the multiple processors. For example, if in the present disclosure the processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
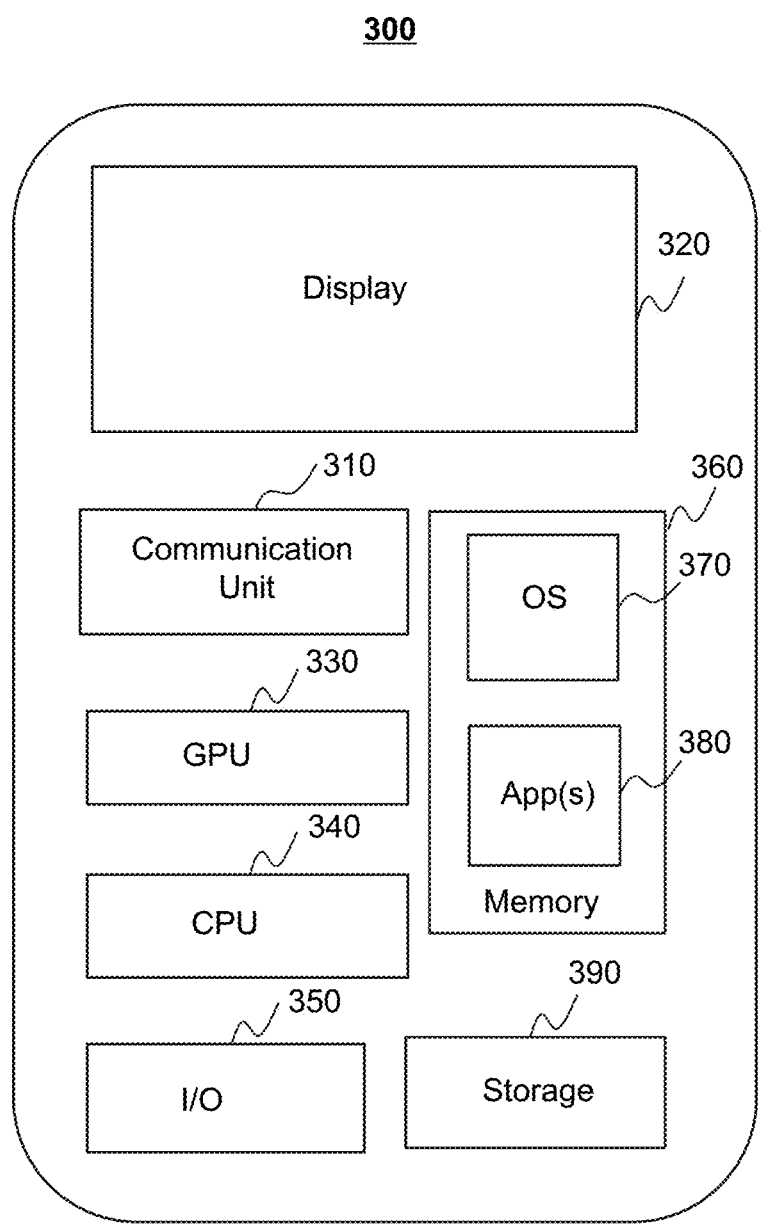
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the control device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile app for receiving and rendering information relating to disaster control or other information from the disaster control system 100. User interactions with the information stream may be achieved via the I/O 350 and provided to the processing engine 112 and/or other components of the disaster control system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or control device. A computer may also act as a server if appropriately programmed.

Figure 4:
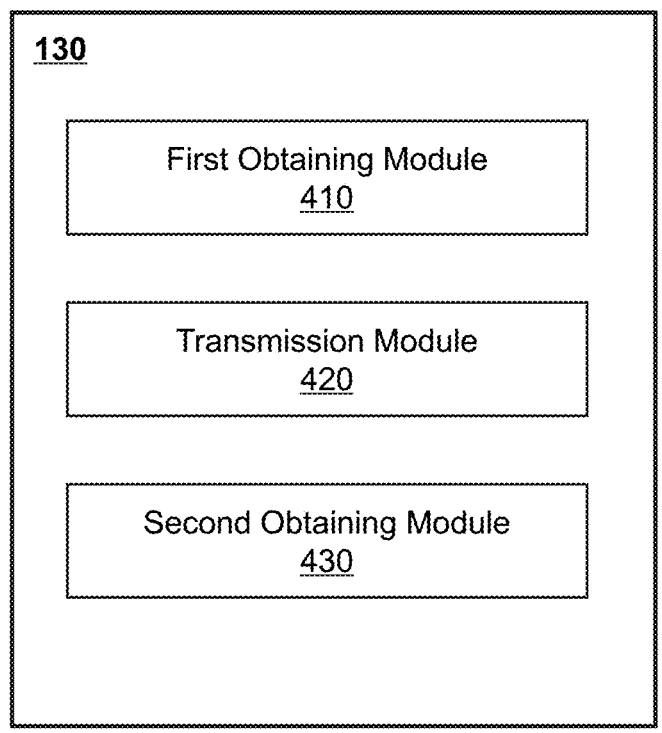
FIG. 4 is a block diagram illustrating an exemplary control device according to some embodiments of the present disclosure.

FIG. 4 is a block diagram illustrating an exemplary control device according to some embodiments of the present disclosure. The control device 130 may include a first obtaining module 410, a transmission module 420, and a second obtaining module 430.

The first obtaining module 410 may be configured to obtain data and/or information (e.g., an alert message, sound information associated with an explosion) associated with the disaster control system 100. For example, the first obtaining module 410 may obtain an alert message including information associated with a disaster in a target area. As another example, the first obtaining module 410 may obtain sound information associated with an explosion in a disaster.

In some embodiments, the first obtaining module 410 may obtain the data and/or information associated with the disaster control system 100 form one or more components (e.g., the processing engine 112, the storage device 140, the camera device 120) of the disaster control system 100, an external storage device, or an external terminal device via the network 150.

The transmission module 420 may be configured to transmit data and/or information (e.g., image data, a shooting instruction) between components (e.g., the processing engine 112, the camera device 120, the storage device 140) of the disaster control system 100. In some embodiments, the transmission module 420 may send a first shooting instruction to at least one camera device (e.g., the camera device 120) to capture first image data associated with a target area. For example, the transmission module 420 may send, to a first camera device (e.g., an unmanned aerial vehicle), a first instruction to direct the first camera device to a target area or an adjacent area to capture second image data. The transmission module 420 may send, to a second camera device, a second instruction to capture third image data. The second camera device may be located in the target area or the adjacent area.

In some embodiments, the transmission module 420 may send, to a third camera device, a second shooting instruction to direct the third camera device to return fourth image data associated with the target area. The fourth images data may be obtained by the third camera device within a predetermined time period. The third camera device may be located in the target area or the adjacent area.

In some embodiments, the transmission module 420 may send a third shooting instruction to the at least one camera device to capture seventh image data. For example, the transmission module 420 may send, to the first camera device, the third shooting instruction to capture the eighth image data associated with the target area. The transmission module 420 may send, to the fourth camera device, the third shooting instruction to capture the ninth image data associated with the target area. The transmission module 420 may send, to the fifth camera device associated with a user, the third shooting instruction to capture the tenth image data associated with the target area.

In some embodiments, in response to the first instruction, the first camera device may generate fifth image data by performing a panoramic shooting on the target area. The fifth image data may be used to construct a map of the target area. The first camera device may generate sixth image data associated with at least one sub-area of a plurality of sub-areas in the target area. In some embodiments, the first camera device may perform a shallow compression operation on the first image data to generate compressed first image data. The first camera device may transmit the compressed first image data to the control device 130 to direct the control device 130 to display the first image data.

In some embodiments, the first camera device may perform a shallow compression operation on the eighth image data to generate compressed eighth image data. The first camera device may transmit the compressed eighth image data to the control device 130. The compressed eighth image data may be displayed on the control device 130. In some embodiments, the fourth camera device may perform a shallow compression operation on the ninth image data to generate compressed ninth image data. The fourth camera device may transmit the compressed ninth image data to the control device 130. The compressed ninth image data may be displayed on the control device 130.

The second obtaining module 430 may be configured to obtain data and/or information associated with the disaster control system 100. In some embodiments, the second obtaining module 430 may obtain a plan for controlling a disaster. The plan may be determined based on information associated with the disaster and first image data captured by at least one camera device (e.g., the camera device 120). For example, the second obtaining module 430 may obtain a first route for entering the target area. The second obtaining module 430 may obtain a second route for leaving the target area. In some embodiments, the second obtaining module 430 may obtain an explosion location associated with a disaster. In some embodiments, the second obtaining module 430 may obtain a location of at least one equipment associated with a disaster. In some embodiments, the second obtaining module 430 may obtain an updated plan for controlling a disaster. The updated plan may be determined based on first image data and seventh image data captured by at least one camera device (e.g., the camera device 120).

In some embodiments, the second obtaining module 430 may obtain the data and/or information associated with the disaster control system 100 from one or more components (e.g., the processing engine 112, the storage device 140, the camera device 120) of the disaster control system 100, an external storage device via the network 150.

The modules in the control device 130 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be combined into a single module. For example, the first obtaining module 410 and the second obtaining module 430 may be combined as a single module. In some embodiments, one or more modules may be added. For example, the control device 130 may further include a storage module (not shown) used to store information and/or data (e.g., image data, a plan) associated with the disaster control system 100.

Figure 5:
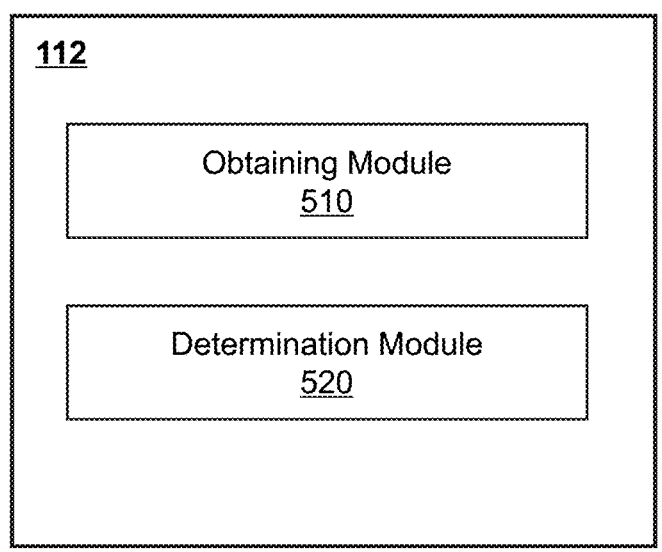
FIG. 5 is a block diagram illustrating an exemplary processing engine according to some embodiments of the present disclosure.

FIG. 5 is a block diagram illustrating an exemplary processing engine according to some embodiments of the present disclosure. The processing engine 112 may include an obtaining module 510, and a determination module 520.

The obtaining module 510 may be configured to obtain data and/or information (e.g., image data, sound information, an alert message) associated with the disaster control system 100. For example, the obtaining module 510 may obtain first image data associated with a target area. The first image data may be captured based on a first shooting instruction. The first shooting instruction may be generated based on an alert message including first information associated with a disaster in the target area. As another example, the obtaining module 510 may obtain an alert message including information associated with a disaster in a target area. As another example, the obtaining module 510 may obtain sound information associated with an explosion in a disaster. In some embodiments, the obtaining module 510 may obtain the data and/or information associated with the disaster control system 100 form one or more components (e.g., the control device 130, the storage device 140, the camera device 120) of the disaster control system 100, an external storage device, or an external terminal device via the network 150.

The determination module 520 may be configured to determine data and/or information associated with the disaster control system 100. In some embodiments, the determination module 520 may determine a plan for controlling a disaster in a target area based on first image data and first information associated with the disaster in the target area. For example, the determination module 520 may determine a first route for entering the target area. The determination module 520 may determine a second route for leaving the target area.

In some embodiments, the determination module 520 may determine, based on first image data, second information associated with a disaster. The second information associated with the disaster in the target area may include a severity of the disaster associated with each sub-area, a disaster development trend of the each sub-area, an entrance of the target area, an exit of the target area, an available route in the target area, or the like, or any combination thereof.

In some embodiments, the determination module 520 may determine, based on second information associated with a disaster in a target area, a first route for entering the target area. For example, the determination module 520 may select the first route from a plurality of available routes in the target area. The first route may include an entrance of the target area, an exit of the target area, at least one first sub-area, and at least one of a second sub-area or a third sub-area. The severity of the disaster associated with the at least one first sub-area may be less than a first predetermined threshold. The disaster development trend of the second sub-area may be greater than a second predetermined threshold. A severity of the disaster severity associated with the third sub-area may be greater than the first predetermined threshold.

In some embodiments, the determination module 520 may determine, based on second information associated with a disaster in a target area, a second route for leaving the target area. For example, the determination module 520 may select the second route from a plurality of available routes in the target area. The second route may include an entrance of the target area, an exit of the target area, and at least one fourth sub-area. A severity of the disaster associated with the at least one fourth sub-area may be less than the first predetermined threshold.

In some embodiments, the determination module 520 may determine an explosion location based on sound information associated with an explosion and a location of at least one camera device (e.g., the camera device 120) associated with a user. In some embodiments, the determination module 520 may determine a location of at least one equipment associated with a disaster according to an Internet of Things (IoT) positioning technology.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be added. For example, the processing engine 112 may further include a storage module (not shown) used to store information and/or data (e.g., image data) associated with the disaster control system 100. In some embodiments, one or more modules may be omitted. For example, the obtaining module 510 may be omitted.

Figure 6:
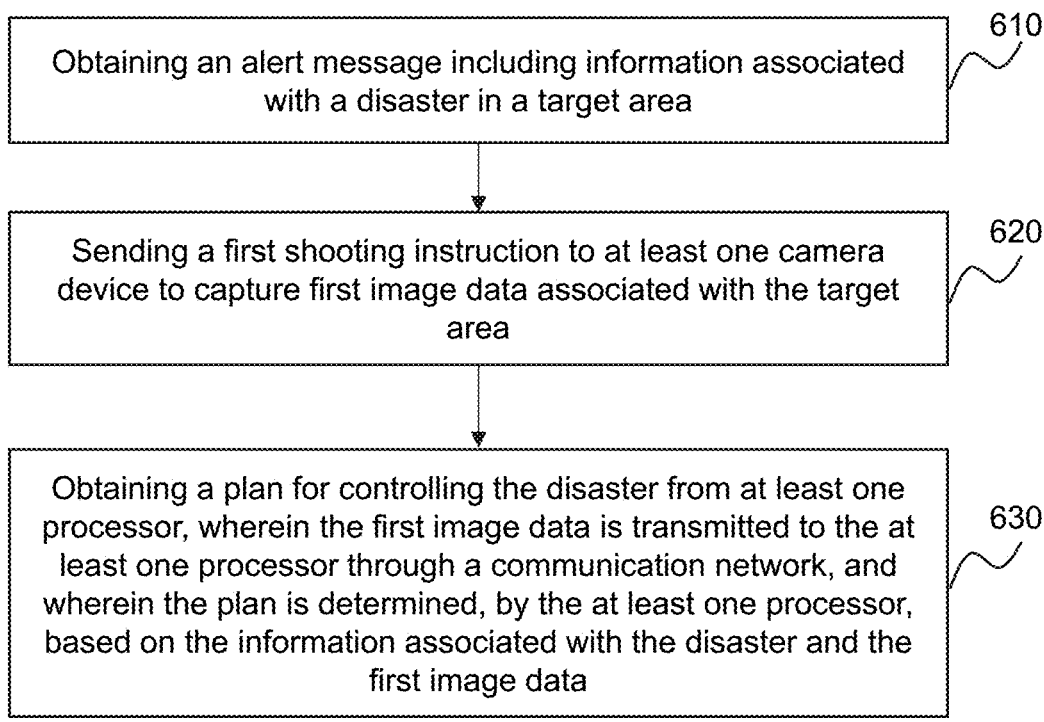
FIG. 6 is a flowchart illustrating an exemplary process for disaster control according to some embodiments of the present disclosure.

FIG. 6 is a flowchart illustrating an exemplary process for disaster control according to some embodiments of the present disclosure. The process 600 may be executed by the disaster control system 100. For example, the process 600 may be implemented as a set of instructions stored in the storage 220. The control device 130 and/or the modules in FIG. 4 may execute the set of instructions, and when executing the instructions, the control device and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of the process 600 as illustrated in FIG. 6 and described below is not intended to be limiting.

In 610, the control device 130 (e.g., the first obtaining module 410) may obtain an alert message, including information associated with a disaster in a target area.

In some embodiments, the control device 130 may be located in a command center. In some embodiments, the control device 130 may include a display and a local server integrated into the control device 130, as described elsewhere in the present disclosure. In some embodiments, the control device 130 may obtain the alert message from one or more components (e.g., the storage device 140) of the disaster control system 100 or a terminal device (e.g., a mobile phone) carried by a subject (e.g., a disaster witness) via the network 150. For example, a subject may send the alert message to the disaster control system 100 via a mobile phone carried by the subject. In some embodiments, the control device 130 may obtain the alert message from the I/O 230 of the computing device 200 via the communication port 250, and/or the I/O 350 of the mobile device 300 via the communication platform 310.

In some embodiments, the alert message may include information associated with the disaster in the target area. The information associated with the disaster in the target area may include a type of the disaster (e.g., flooding, fires, earthquakes, hurricanes, mudslides), a time of the disaster, a location of the disaster, or the like, or any combination thereof.

In some embodiments, the target area may be divided into a plurality of sub-areas. The sub-areas may be any size or shape. The shapes and/or sizes of different sub-areas may be the same or different. In some embodiments, the target area may be divided into a plurality of sub-areas with the same size and shape. For example, the target area may be uniformly divided into a plurality of sub-areas having a polygonal shape, such as a regular triangle, a rectangle, a square, or a regular hexagon.

In 620, the control device 130 (e.g., the transmission module 420) may send a first shooting instruction to at least one camera device (e.g., the camera device 120) to capture first image data associated with the target area.

In some embodiments, the at least one camera device (e.g., the camera device 120) may include a 5G camera, an unmanned aerial vehicle (UAV), a smart robot (e.g., a firefighting robot), or the like, or any combination thereof, as described elsewhere in the present disclosure (e.g., FIG. 1 and descriptions thereof).

In some embodiments, the first shooting instruction may include a first instruction and a second instruction. The first image data may include second image data and third image data. The at least one camera device may include a first camera device and a second camera device.

In some embodiments, the control device 130 may send, to the first camera device, the first instruction to direct the first camera device to enter the target area or an adjacent area to capture the second image data. In some embodiments, the first camera device may be an unmanned aerial vehicle. In some embodiments, a distance between the adjacent area and the target area may be less than a threshold (e.g., 50 m, 100 m, 200 m, 500 m). The distance may be a straight-line distance or a travel distance from the adjacent area to the target area. In some embodiments, the control device 130 may send the first instruction to a control device associated with the first camera device. As used herein, the control device associated with the first camera device may be used to control the first camera device. In some embodiments, the control device 130 may send the first instruction to the first camera device directly.

In some embodiments, the control device 130 may send, to the second camera device, the second instruction to capture the third image data. The second camera device may be located in the target area or the adjacent area. In some embodiments, the second camera device may be a static camera. For example, the second camera device may be a surveillance camera for monitoring the target area. A shooting range of the second camera device may include or partially overlap with the target area. In some embodiments, the second instruction may be used to instruct the second camera device to capture the third image data associated with the target area and/or to return the third image data associated with the target area captured by the second camera device.

According to some embodiments of the present disclosure, the image data associated with the target area may be captured by the first camera device (e.g., the unmanned aerial vehicle) and the second camera device (e.g., the static camera), which may ensure a comprehensive, timely, and efficient acquisition of information associated with the disaster in the target area. Therefore, a scene situation of the disaster may be determined based on the information associated with the disaster quickly and accurately.

In some embodiments, the control device 130 may send, to a third camera device, a second shooting instruction to direct the third camera device to return fourth image data associated with the target area. In some embodiments, the fourth images data may be obtained by the third camera device within a predetermined time period. In some embodiments, the predetermined time period may be a historical time period close to the present moment, for example, in the past five minutes, ten minutes, or twenty minutes. In some embodiments, the predetermined time period may be a historical time period close to the time of the disaster. The third camera device may be located in the target area or the adjacent area. In some embodiments, the type of the third camera device may be the same as or different from the type of the second camera device. For example, the third camera device may be a static camera, e.g., a surveillance camera for monitoring the target area. In some embodiments, the third camera device and the second camera device may be a same camera device.

In some embodiments, the fourth image data may be used to determine a preliminary plan for controlling the disaster. The preliminary plan may include a number of rescuers, a type of rescuer (e.g., different types of rescuers may perform different types of works), a number of rescue equipment, a type of rescue equipment, or the like, or any combination thereof. Taken a fire disaster as an example, the type of firefighting equipment may include a fire-extinguishing equipment (e.g., a fire extinguisher), an alarm equipment (e.g., an alarm notification device, an alarm initiating device), an evacuation equipment (a stretchers, a slide mattresses, an evacuation cords, an evacuation ladders, an evacuation mat), a firefighting water equipment (e.g., a pump, a water tank, a firehose), other firefighting equipment (e.g., a fire axe, a hydrant, a sledgehammer, a thermal imaging helmet, a door opener), or the like, or any combination thereof.

In some embodiments, the second image data may include fifth image data and sixth image data. In some embodiments, in response to the first instruction, the first camera device may generate the fifth image data by performing a panoramic shooting on the target area. The fifth image data may be used to construct a map of the target area. In some embodiments, the map of the target area may be constructed based on the fifth image data according to an image stitching/registration algorithm. Exemplary image stitching/register algorithms may include an iterative closest point (ICP) algorithm, a robust point matching (RPM) algorithm, a Kernel correlation (KC) algorithm, a coherent point drift (CPD) algorithm, a sorting the correspondence space (SCS) algorithm, or the like. In some embodiments, the map of the target area may be constructed by one or more components (e.g., the first camera device, the control device 130, the processing engine 112) of the disaster control system 100. For example, the first camera device may construct the map of the target area based on the fifth image data and transmit the map of the target area to the control device 130 via the network 150 (e.g., a 5G network). As another example, the first camera device may transmit the fifth image data to the one or more other components (e.g., the control device 130, the processing engine 112) of the disaster control system 100. The one or more other components (e.g., the control device 130, the processing engine 112) of the disaster control system 100 may construct the map of the target area based on the fifth image data.

In some embodiments, in response to the first instruction, the first camera device may generate the sixth image data associated with at least one sub-area of the plurality of sub-areas. For example, the first camera device may perform a shooting in a predetermined angle on the at least one sub-area to generate the sixth image data. The sixth image data may be used to determine information associated with the disaster in the at least one sub-area. In some embodiments, the information associated with the disaster in the at least one sub-area may include a severity of the disaster associated with the at least one sub-area, a disaster development trend of the at least one sub-area, or the like, or any combination thereof. As used herein, "a severity of the disaster associated with a sub-area" may indicate a size of the disaster. A larger size of the disaster may correspond to a greater severity of the disaster. The size of the disaster may be measured based on a scope, an intensity, and/or a duration of the disaster. A larger scope (or a greater intensity, a longer duration) of the disaster may correspond to a larger size of the disaster. The scope of the disaster may refer to a measure of the breadth of damage caused by the disaster. The intensity of the disaster may refer to the level of damage in terms of injuries and deaths. The duration of the disaster may refer to a length of the disaster, or a length of time people are affected by the disaster. As used herein, "a disaster development trend of a sub-area (also referred to as a change parameter)" may indicate a trend of disaster from small to large or from large to small.

In some embodiments, after the map of the target area is constructed, the information associated with the disaster in the at least one sub-area may be added on the map of the target area. For example, indication information associated with the severity of the disaster associated with each sub-area of the plurality of sub-areas and indication information associated with the disaster development trend of the each sub-area of the plurality of sub-areas may be added on the map of the target area.

In some embodiments, the at least one camera device may transmit the first image data to the control device 130 using a 5G network. In some embodiments, the at least one camera device may compress the first image data to generate compressed first image data. For example, the at least one camera device may compress the first image data according to a shallow compression algorithm. Exemplary shallow compression algorithms may include a motion joint photographic expert group (MJPEG) algorithm, an H.264 encoding algorithm, or the like, or any combination thereof. Accordingly, the first image data may be compressed by the shallow compression algorithm, which may reduce the compression time. The user (e.g., a director) of the control device 130 may obtain the first image data in real-time, thereby realizing a real-time control of the at least one camera device. As another example, the at least one camera device may compress the first image data according to a deep compression algorithm. Accordingly, the first image data may be compressed by the deep compression algorithm, which may reduce a code rate and improve a reliability of the transmission between the at least one camera device and the control device 130. The at least one camera device may transmit the compressed first image data to the control device 130 using the 5G network. The control device 130 may decompress the compressed first image data and display the first image data.

In some embodiments, the first camera device may compress the second image data (e.g., the fifth image data, the sixth image data) to generate compressed second image data (e.g., compressed fifth image data, compressed sixth image data). For example, the first camera device may compress the second image data (e.g., the fifth image data, the sixth image data) according to the shallow compression algorithm. The first camera device may transmit the compressed second image data (e.g., the compressed fifth image data, the compressed sixth image data) to a control device (e.g., the control device 130, a control device associated with the first camera device). The control device (e.g., the control device 130, the control device associated with the first camera device) may decompress the compressed second image data (e.g., the compressed fifth image data, the compressed sixth image data) and display the second image data (e.g., the fifth image data, the sixth image data). As used herein, the control device associated with the first camera device may be used for controlling the first camera device. More descriptions of the control of the first camera device may be found elsewhere in the present disclosure (e.g., FIG. 11 and descriptions thereof).

In 630, the control device 130 (e.g., the second obtaining module 430) may obtain a plan for controlling the disaster from at least one processor (e.g., the processing engine 112). In some embodiments, the control device 130 may obtain the plan from the at least one processor (e.g., the processing engine 112) via the network 150 (e.g., a 5G network). The control device 130 may display the plan on the display of the control device 130.

In some embodiments, the plan may include a first route for entering the target area, a second route for leaving the target area, or the like, or any combination thereof. In some embodiments, the processing engine 112 may determine the plan based on the information associated with the disaster and the first image data. For example, the processing engine 112 may extract and/or identify feature information from the first image data according to one or more object detection algorithms and/or one or more feature extraction algorithms. The processing engine 112 may determine the plan based on the extracted feature information. More descriptions of the determination of the plan may be found elsewhere in the present disclosure (e.g., FIG. 8 and descriptions thereof).

In some embodiments, the plan may be determined based on the first image data automatically and without subjective human decisions, which may reduce labor cost. The accuracy and timeliness of the plan may also be improved. In some embodiments, the plan may be transmitted to a user (e.g., a director) of the disaster control system 100. The user (e.g., the director) may determine a target plan based on the plan.

According to some embodiments of the present disclosure, after the alert message is obtained, the at least one camera device (e.g., the camera device 120) may capture image data (e.g., the first image data) associated with the target area, which may ensure that the acquired information associated with the disaster is timely and comprehensive. The at least one camera device may transmit the image data (e.g., the first image data) associated with the target area to the processing engine 112 via a 5G network. The processing engine 112 may determine a plan for controlling the disaster based on the image data (e.g., the first image data). Therefore, in some embodiments, the plan for controlling the disaster may be determined quickly and efficiently, and without subjective human decisions. The efficiency of the plan determination may be improved, the casualties may be reduced, and the safety of the property may be ensured. In some embodiments, the plan for controlling the disaster determined by the processing engine 112 may be a candidate plan. A user (e.g., a director) of the disaster control system 100 may determine a target plan based on the candidate plan.

In some embodiments, after the plan is obtained, the control device 130 (e.g., the transmission module 420) may send a third shooting instruction to the at least one camera device (e.g., the camera device 120) to capture seventh image data. In some embodiments, the seventh image data may include eighth image data, ninth image data, and tenth image data. The at least one camera device may further include a fourth camera device and a fifth camera device.

In some embodiments, the control device 130 may send, to the first camera device (e.g., the unmanned aerial vehicle), the third shooting instruction to capture the eighth image data associated with the target area. For example, the first camera device may perform a shooting on at least one sub-area of the plurality of sub-areas based on the third shooting instruction.

In some embodiments, the control device 130 may send, to the fourth camera device, the third shooting instruction to capture the ninth image data associated with the area. In some embodiments, the fourth camera device may be a smart robot. For example, the fourth camera device may be a firefighting robot. In some embodiments, the fourth camera device (e.g., the firefighting robot) may capture a 360-degree panoramic video (or a video of other angles, e.g., 270 degrees, 180 degrees) of the target area and/or a thermal imaging video based on the third shooting instruction.

In some embodiments, the control device 130 may send, to the fifth camera device associated with a user (e.g., a firefighter), the third shooting instruction to capture the tenth image data associated with the target area. In some embodiments, the fifth camera device may be mounted on one or more components carried by the user (e.g., a firefighter). For example, the fifth camera device may be mounted on a rescue gear of a firefighter to capture the tenth image data associated with the surrounding environment. As another example, the fifth camera device may be attached to one or more portions (e.g., a wrist or an ankle) of a firefighter to capture the tenth image data associated with the surrounding environment.

In related arts, due to the control of a camera device (e.g., a firefighting robot) and/or image transmission between the camera device and a control device (e.g., a control device in a command center) is limited by a data transmission distance, the disaster rescue may mainly rely on a rescuer (e.g., a firefighter), which may increase the rescue risk of the rescuer. In addition, when investigating a disaster situation, the rescuer may need to enter a disaster scene. Image data and/or sensor data associated with the disaster scene may be obtained by the camera device carried by the rescuer. The image data and/or the sensor data captured by the camera device may be transmitted to the control device via a wireless network. A number (or count) of nodes associated with the rescuers and the data transmission distance may be limited by a present wireless mesh system. More descriptions of the present wireless mesh system may be found elsewhere in the present disclosure (e.g., FIG. 10 and descriptions thereof). Image data captured by an unmanned aerial vehicle may be transmitted to the control device based on a ground station. Image data capture by a smart robot may be transmitted to the control device via a 4G network. Furthermore, a user (e.g., a director) in the command center may obtain information associated with the disaster by communicating with the rescuer via an intercom. The director may determine and/or adjust a plan for controlling the disaster based on the obtained information associated with the disaster and the obtained image data. Due to the obtained information is limited, the plan for controlling the disaster may also be inaccurate. According to some embodiments of the present disclosure, the above problems may be effectively solved.

In some embodiments, the at least one camera device may transmit the seventh image data to a control device (e.g., the control device 130) using a 5G network. In some embodiments, the at least one camera device may compress the seventh image data to generate compressed seventh image data. The at least one camera device may transmit the compressed seventh image data to the control device (e.g., the control device 130) using the 5G network. The control device (e.g., the control device 130) may decompress the compressed seventh image data and display the seventh image data.

In some embodiments, the first camera device may compress the eighth image data to generate compressed eighth image data. For example, the first camera device may compress the eighth image data according to a shallow compression algorithm as described elsewhere in the present disclosure. The first camera device may transmit the compressed eighth image data to the control device (e.g., the control device 130, the control device associated with the first camera device). The control device (e.g., the control device 130, the control device associated with the first camera device) may decompress the compressed eighth image data and display the eighth image data.

In some embodiments, the fourth camera device may compress the ninth image data (e.g., the 360-degree panoramic video and/or the thermal imaging video) to generate compressed ninth image data. For example, the fourth camera device may compress the ninth image data according to a shallow compression algorithm as described elsewhere in the present disclosure. The fourth camera device may transmit the compressed ninth image data to the control device (e.g., the control device 130, a control device associated with the fourth camera device). The control device (e.g., the control device 130, the control device associated with the fourth camera device) may decompress the compressed ninth image data and display the ninth image data. As used herein, the control device associated with the fourth camera device may be used for controlling the fourth camera device. More descriptions of the control of the fourth camera device may be found elsewhere in the present disclosure (e.g., FIG. 11 and descriptions thereof).

According to some embodiments of the present disclosure, the eighth image data and the ninth image data may be compressed by a shallow compression algorithm, which may reduce the compression time. The user (e.g., a director) of the control device 130 may obtain the eighth image data and the ninth image data in real time, thereby realizing a real-time control of the first camera device and the fourth camera device. In addition, the user may adjust the control of the first camera device and the fourth camera device based on the eighth image data and the ninth image data.

In some embodiments, the control device 130 (e.g., the second obtaining module 430) may obtain an updated plan for controlling the disaster from the at least one processor (e.g., the processing engine 112). In some embodiments, the control device 130 may obtain the updated plan from the at least one processor (e.g., the processing engine 112) via the network 150 (e.g., a 5G network). The updated plan may be displayed on the control device 130.

As used herein, the updated plan may be used in a rescue process. In the rescue process, the severity of the disaster in the target area may change as the rescue progresses. Accordingly, the plan for controlling the disaster may also be updated in the rescue process. The updated plan may better cope with an actual disaster development trend.

In some embodiments, the processing engine 112 may determine the updated plan based on the first image data and the seventh image data. In some embodiments, the determination of the updated plan may be similar to the determination of the plan, and detailed descriptions may not be repeated here.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the processing engine 112 may determine a location of at least one rescue equipment associated with the disaster according to an Internet of Things (IoT) positioning (e.g., a narrow band IoT) technology and/or a global navigation satellite system (GNSS) technology. The rescue equipment may include the at least one camera device (e.g., the camera device 120), or the rescue equipment used to control the disaster as described elsewhere in the present disclosure. For example, an IoT positioning device may be mounted in the rescue equipment. The processing engine 112 may determine the location of the rescue equipment based on signals transmitted from the IoT positioning device mounted in the rescue equipment.

In related arts, after the rescue is completed, a rescuer (e.g., a firefighter) may manually check the rescue equipment associated with the disaster, and search for a piece of lost rescue equipment in the target area. Since the lost rescue equipment cannot be quickly located, the search process may be time-consuming, and it is difficult to know whether the rescue equipment has all been found.

According to some embodiments of the present disclosure, the rescue equipment equipped with the IoT positioning device may be quickly located, which may achieve a one-click inventory of the rescue equipment. The location of the rescue equipment may also be displayed on a control device (e.g., the control device 130). Therefore, unnecessary manpower may be reduced, and the safety of the rescuer may also be guaranteed.

Figure 7:
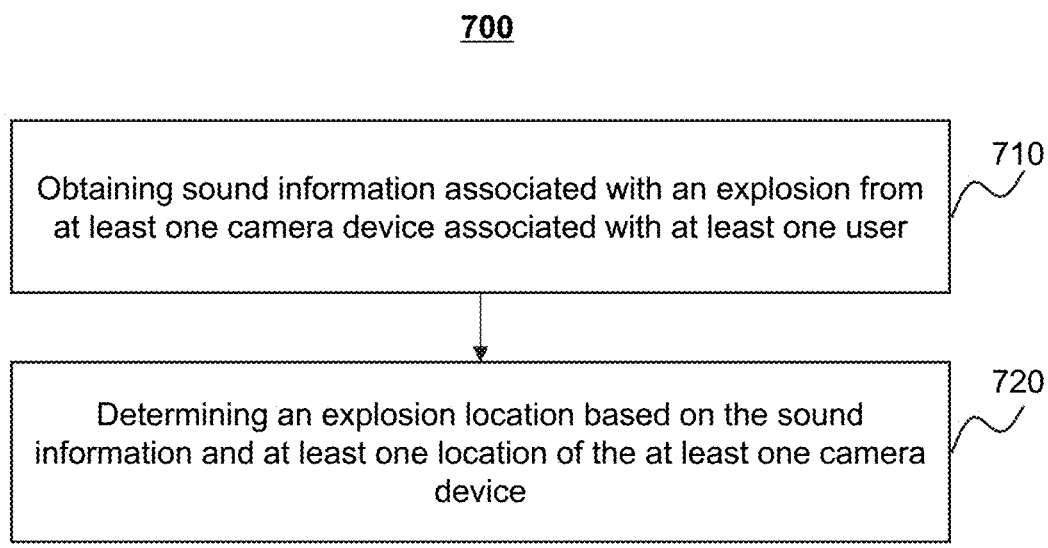
FIG. 7 is a flowchart illustrating an exemplary process for determining an explosion location according to some embodiments of the present disclosure.

FIG. 7 is a flowchart illustrating an exemplary process for determining an explosion location according to some embodiments of the present disclosure. The process 700 may be executed by the disaster control system 100. For example, the process 700 may be implemented as a set of instructions stored in the storage (e.g., ROM 230, RAM 240). The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of the process 700 as illustrated in FIG. 7 and described below is not intended to be limiting.

In 710, the processing engine 112 (e.g., the obtaining module 510) may obtain sound information associated with an explosion from at least one camera device (e.g., the camera device 120) associated with at least one user (e.g., a firefighter).

In some embodiments, the processing engine 112 may obtain the sound information associated with the explosion from the at least one camera device (e.g., the camera device 120) via the network 150 (e.g., a 5G network). For example, the at least one camera device may obtain the sound information associated with the explosion via an I/O port, for example, a microphone of the at least one camera device.

In 720, the processing engine 112 (e.g., the determination module 520) may determine an explosion location based on the sound information and at least one location of the at least one camera device (e.g., the camera device 120).

In some embodiments, a location of the camera device may be a geographic location (e.g., longitudinal and latitudinal coordinates) where the camera device locates. In some embodiments, the processing engine 112 may obtain the geographic location of the camera device from one or more components of the disaster control system 100. For example, the camera device may be equipped with one or more sensors with positioning function, and the processing engine 112 may obtain the geographic coordinates of the camera device from the one or more sensors. Specifically, the processing engine 112 may obtain the geographic coordinates of the camera device via a GPS device and/or an inertial measurement unit (IMU) sensor mounted on the camera device.

In some embodiments, the processing engine 112 may determine the explosion location based on the sound information and the at least one location of the at least one camera device according to one or more sound localization algorithms. Exemplary sound localization algorithms may include a steered beamformer approach, a collocated microphone array approach, a learning method for binaural hearing, a head-related transfer function (HRTF), a cross-power spectrum phase (CSP) analysis, a 2D sensor line array, a hierarchical fuzzy artificial neural networks approach, or the like, or any combination thereof.

In some embodiments, the processing engine 112 may transmit the explosion location to a control device (e.g., the control device 130) via the network 150 (e.g., a 5G network). The processing engine 112 may cause the control device 130 to display the explosion location. In some embodiments, the processing engine 112 may cause the control device to display the explosion location in the form of text, graph, audio, video, or the like, or any combination thereof. For example, the explosion location may be displayed as an indicator on a map of a target area as described elsewhere in the present disclosure.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 8 is a flowchart illustrating an exemplary process for disaster control according to some embodiments of the present disclosure. The process 800 may be executed by the disaster control system 100. For example, the process 800 may be implemented as a set of instructions stored in the storage (e.g., ROM 230, RAM 240). The processor 220 and/or the modules in FIG. 4 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order of the operations of the process 800 as illustrated in FIG. 8 and described below is not intended to be limiting.

In 810, the processing engine 112 (e.g., the obtaining module 510) may obtain first image data associated with a target area from at least one camera device (e.g., the camera device 120). In some embodiments, the processing engine 112 may obtain the first image data from the at least one camera device (e.g., the camera device 120) via the network 150 (e.g., a 5G network).

In some embodiments, the at least one camera device (e.g., the camera device 120) may include a 5G camera, an unmanned aerial vehicle (UAV), a smart robot (e.g., a firefighting robot), or the like, or any combination thereof, as described elsewhere in the present disclosure. In some embodiments, the first image data may be captured based on a first shooting instruction. The first shooting instruction may be generated based on an alert message including first information associated with a disaster in the target area. In some embodiments, the first information associated with the disaster in the target area may include a type of the disaster (e.g., flooding, fires, earthquakes, hurricanes, mudslides), a time of the disaster, a location of the disaster, or the like, or any combination thereof. More descriptions of the obtaining of the first image data may be found elsewhere in the present disclosure (e.g., operations 610 and 620 in FIG. 6, and descriptions thereof).

In 820, the processing engine 112 (e.g., the determination module 520) may determine, based on the first image data and the first information associated with the disaster in the target area, a plan for controlling the disaster.

In some embodiments, the plan may include a first route for entering the target area, a second route for leaving the target area, or the like, or any combination thereof. In some embodiments, the processing engine 112 may determine the plan based on the first information associated with the disaster and the first image data. In some embodiments, the processing engine 112 may determine second information associated with the disaster based on the first image data. In some embodiments, the second information associated with the disaster in the target area may include a severity of the disaster associated with each sub-area of a plurality of sub-areas in the target area, a disaster development trend of the each sub-area, an entrance of the target area, an exit of the target area, an available route in the target area, or the like, or any combination thereof.

In some embodiments, the processing engine 112 may extract and/or identify feature information from the first image data according to one or more object detection algorithms and/or one or more feature extraction algorithms. For example, the processing engine 112 may first detect an object (e.g., a gate, a building, a person, a plant, an animal, a fire) in the first image data and further extract the feature information associated with the object. The processing engine 112 may detect the object in the first image data based on an object detection algorithm (e.g., an inter-frame difference algorithm, a background difference algorithm, an optical flow algorithm). After detecting the object in the first image data, the processing engine 112 may extract the feature information associated with the object based on a feature extraction algorithm. Exemplary feature extraction algorithm may include a principal component analysis (PCA), a linear discriminant analysis (LDA), an independent component analysis (ICA), a multi-dimensional scaling (MDS) algorithm, a discrete cosine transform (DCT) algorithm, or the like. For example, the processing engine 112 may determine the feature information such as a gate feature, a building feature, a person feature, a fire feature, based on a machine learning model (e.g., a neural network model, a regression model, a classification tree model). The processing engine 112 may determine the second information based on the extracted feature information.

In some embodiments, the processing engine 112 may determine the first route for entering the target area based on the first information and the second information. For example, the processing engine 112 may select the first route from a plurality of available routes in the target area. The first route may include the entrance of the target area, the exit of the target area, at least one first sub-area, and at least one of a second sub-area or a third sub-area. The severity of the disaster associated with the at least one first sub-area may be less than a first predetermined threshold. The disaster development trend of the second sub-area may be greater than a second predetermined threshold. A severity of the disaster severity associated with the third sub-area may be greater than the first predetermined threshold. In some embodiments, the rescuer may control the disaster (e.g., extinguish the fire) in the at least one of the second sub-area or the third sub-area.

In some embodiments, the processing engine 112 may determine the second route for leaving the target area based on the first information and the second information. For example, the processing engine 112 may select the second route from the plurality of available routes in the target area. The second route may include the entrance of the target area, the exit of the target area, and at least one fourth sub-area.

A severity of the disaster associated with the at least one fourth sub-area may be less than the first predetermined threshold.

In some embodiments, the first predetermined threshold (or the second predetermined threshold) may be a preset value or a preset range. The first predetermined threshold (or the second predetermined threshold) may be a default parameter stored in a storage device (e.g., the storage device 140). Additionally, or alternatively, the first predetermined threshold (or the second predetermined threshold) may be set manually or determined by one or more components (e.g., the processing engine 112) of the disaster control system 100 according to different situations.

In some embodiments, after the plan is determined, the processing engine 112 may transmit the plan to a control device (e.g., the control device 130) via the network 150 (e.g., a 5G network). The plan may be displayed on the control device (e.g., the control device 130).

According to some embodiments of the present disclosure, after the alert message is obtained, the at least one camera device (e.g., the camera device 120) may capture image data (e.g., the first image data) associated with the area, which may ensure that the acquired information associated with the disaster is timely and comprehensive. The at least one camera device may transmit the image data (e.g., the first image data) associated with the target area to the processing engine 112 via a 5G network. The processing engine 112 may determine a plan for controlling the disaster based on the image data (e.g., the first image data). Therefore, in some embodiments, the plan for controlling the disaster may be determined quickly and efficiently, and without subjective human decisions. The efficiency of plan determination may be improved, the casualties may be reduced, and the safety of the property may be ensured.

In 830, the processing engine 112 (e.g., the obtaining module 510) may obtain second image data from the at least one camera device (e.g., the camera device 120). In some embodiments, the processing engine 112 may obtain the second image data from the at least one camera device (e.g., the camera device 120) via the network 150 (e.g., a 5G network).

In some embodiments, the second image data may be captured based on a second shooting instruction. The second shooting instruction may be generated by a control device (e.g., the control device 130). More descriptions of the obtaining of the second image data may be found elsewhere in the present disclosure (e.g., operation 630 in FIG. 6 and descriptions thereof).

In 840, the processing engine 112 (e.g., the determination module 520) may determine, based on the first image data and the second image data, an updated plan for controlling the disaster.

As used herein, an updated plan may be used in a rescue process. In the rescue phase, the severity of the disaster in the target area may change as the rescue progresses. Accordingly, the plan for controlling the disaster may also be updated in the rescue process.

In some embodiments, after the updated plan is determined, the processing engine 112 may transmit the updated plan to a control device (e.g., the control device 130) via the network 150 (e.g., a 5G network). The updated plan may be displayed on the control device (e.g., the control device 130).

In a traditional disaster control method and system, limited information associated with a disaster may be obtained, a plan for controlling the disaster may not be determined timely, and the rescue process is highly dangerous. According to some embodiments of the present disclosure, image data associated with the disaster in the target area may be obtained via a 5G network. The image data may be transmitted without lag by using a 5G network slicing. As used herein, a 5G network slicing may refer to a network architecture that enables the multiplexing of virtualized and independent logical networks on the same physical network infrastructure. An unmanned aerial vehicle may be controlled by a control device (e.g., the control device 130) via the 5G network, which may break a transmission limit of a traditional remote controller. The control device in a command center may control the unmanned aerial vehicle to fly to the target area. After a rescuer arrived at the target area, the rescuer may take over the control of the unmanned aerial vehicle via a control device associated with the rescuer. A plan for controlling the disaster may be determined by a server implemented on an edge computing platform. Combined the shooting of the target area by the unmanned aerial vehicle, and the edge computing platform, the plan may be determined accurately and efficiently without the need for the rescuer to enter the target area for surveying.

In addition, the system and method for disaster control disclosed in the present disclosure may change a traditional communication networking model and a traditional operational command model, in order to solve the problem of the limited manipulation distance and high cost in the traditional disaster control process. In the rescue process, the 5G network may provide a transmission control model with a base station as center, which may break a line-of-sight transmission limitation and reduce the number of nodes in the control and data transmission process. Therefore, time delay in the data transmission process may be reduced, the efficiency of data synchronization may be improved, and the data may be transmitted in real-time. Furthermore, control rights of the at least one camera (e.g., the unmanned aerial vehicle) may be switched between local (e.g., a fire scene) and remote (e.g., a command center, a control device in the command center), to ensure the safety of the firefighters. In the investigation of the disaster situation, the application of a rescue equipment such as the unmanned aerial vehicle controlled by 5G remote control was introduced, which may reduce the number of nodes in the control and data transmission process, the time delay in the data transmission process may be reduced, and the image data may be transmitted to a 5G edge node in real-time.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, before determining second information associated with the disaster based on the first image data, the processing engine 112 may preprocess the first image data. For example, the processing engine 112 may enlarge a specific region in the first image data to identify a region of interest (ROI). As another example, the processing engine 112 may reduce noise(s) in the first image data based on a noise reduction technique (e.g., a wavelet noise reduction technique). As a further example, the processing engine 112 may compress the first image data to increase the processing speed.

In some embodiments, an operation for determining a location of at least one rescue equipment associated with the disaster may be added in process 800, as described elsewhere in the present disclosure (e.g., FIG. 6 and descriptions thereof). In some embodiments, an operation for determining an explosion location in the disaster may be added in process 800, as described elsewhere in the present disclosure (e.g., FIG. 7 and descriptions thereof).

Figure 9:
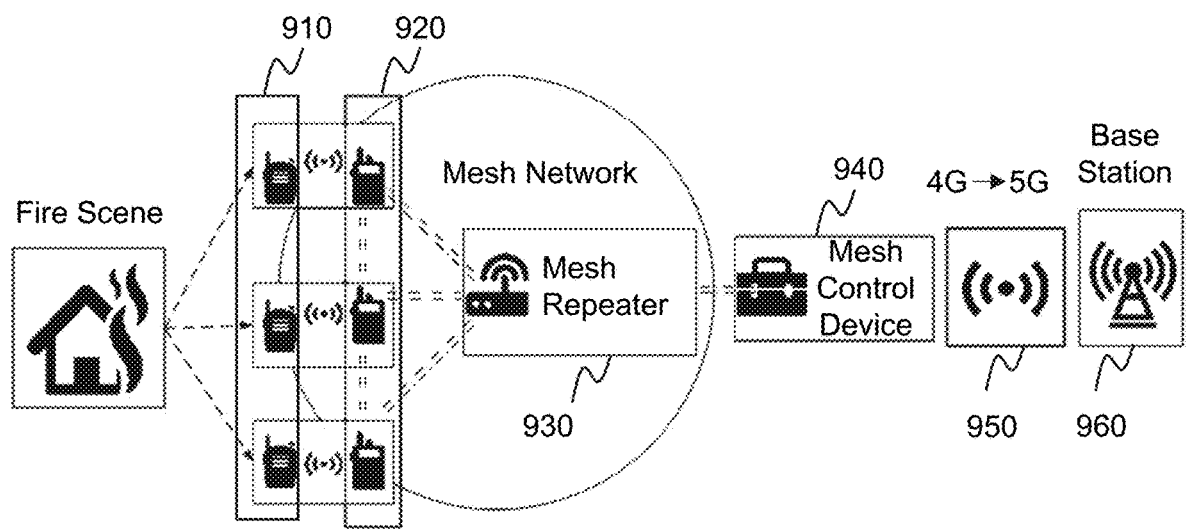
FIG. 9 is a schematic diagram illustrating an exemplary process for fire disaster control according to some embodiments of the present disclosure.

FIG. 9 is a schematic diagram illustrating an exemplary process for fire disaster control according to some embodiments of the present disclosure.

As illustrated in FIG. 9, in a rescue process, a plurality of camera devices 910 carried by a plurality of rescuers (e.g., firefighters) may capture image data associated with a fire scene. The plurality of camera devices 910 may transmit the image data to a mesh control device 940 via a mesh network. In some embodiments, a 5G link backup 920 may be added in the mesh network. When the mesh network is a failure, the 5G backup transmission may ensure the stability of data transmission between the plurality of camera devices 910 and the mesh control device 940. In addition, when a number (or count) of the rescuers is relatively large (e.g., larger than a threshold), the bandwidth of the network (e.g., the mesh network, the 5G network) may be dynamically allocated. For example, the bandwidth of the mesh network may be used to ensure data transmission in a place (e.g., a basement) where a 5G signal is relatively weak, and the bandwidth of the 5G network may be used to ensure data transmission in other places. A mesh repeater 930 may be typically used to improve a signal range as well as a strength. The mesh control device 940 may further transmit the image data to one or more components (e.g., the processing engine 112, the control device 130) of the disaster control system 100 via a 5G network instead of a 4G network. The 5G network may provide a transmission control model with a base station 960 as a center, which may break a line-of-sight transmission limitation.

Figure 10:
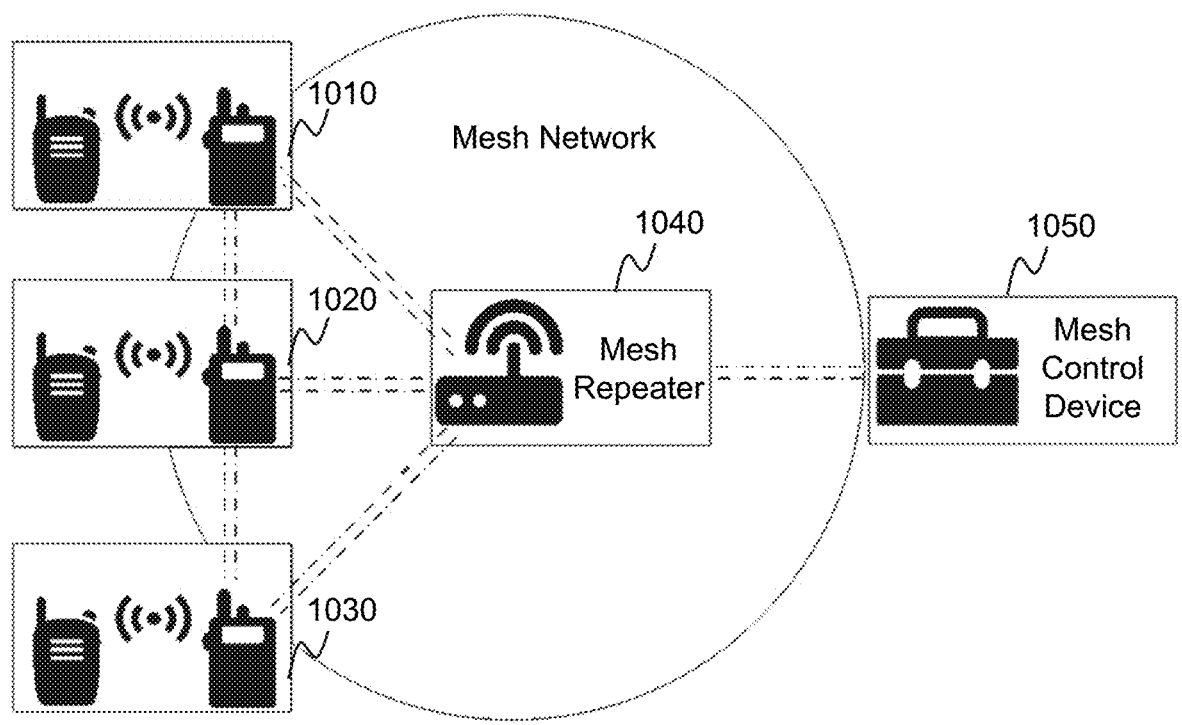
FIG. 10 is a schematic diagram illustrating an exemplary interaction between a camera device and a control device according to some embodiments of the present disclosure.

FIG. 10 is a schematic diagram illustrating an exemplary interaction between a camera device and a control device according to some embodiments of the present disclosure.

As illustrated in FIG. 10, in a traditional rescue process, a plurality of camera devices (e.g., a camera device 1010, a camera device 1020, a camera device 1030) carried by a plurality of rescuers (e.g., firefighters) may capture image data associated with a fire scene. The plurality of camera devices may transmit the image data to a mesh control device 1050 via a mesh network. The mesh repeater 1040 may be used to improve a signal range as well as a strength. A number (or count) of camera devices may be limited by a data transmission distance of the mesh network.

Figure 11:
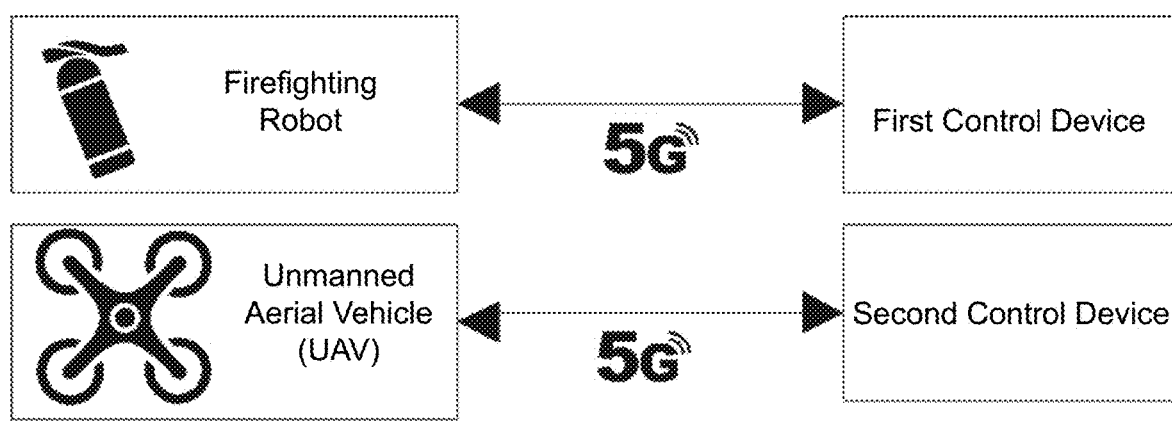
FIG. 11 is a schematic diagram illustrating an exemplary process for controlling a camera device according to some embodiments of the present disclosure.

FIG. 11 is a schematic diagram illustrating an exemplary process for controlling a camera device according to some embodiments of the present disclosure. As illustrated in FIG. 11, a firefighting robot may be remotely controlled based on a first instruction provided by a user (e.g., a firefighter, a director) via a first control device (e.g., the control device 130) using a 5G network. A UAV may be remotely controlled based on a second instruction provided by a user (e.g., a firefighter, a director) via a second control device (e.g., the control device 130) using the 5G network. In some embodiments, the first control device or the second control device may include a mobile device, a tablet computer, a laptop computer, or the like, or any combination thereof, as described elsewhere in the present disclosure (e.g., FIG. 1 and descriptions thereof).

Figure 12:
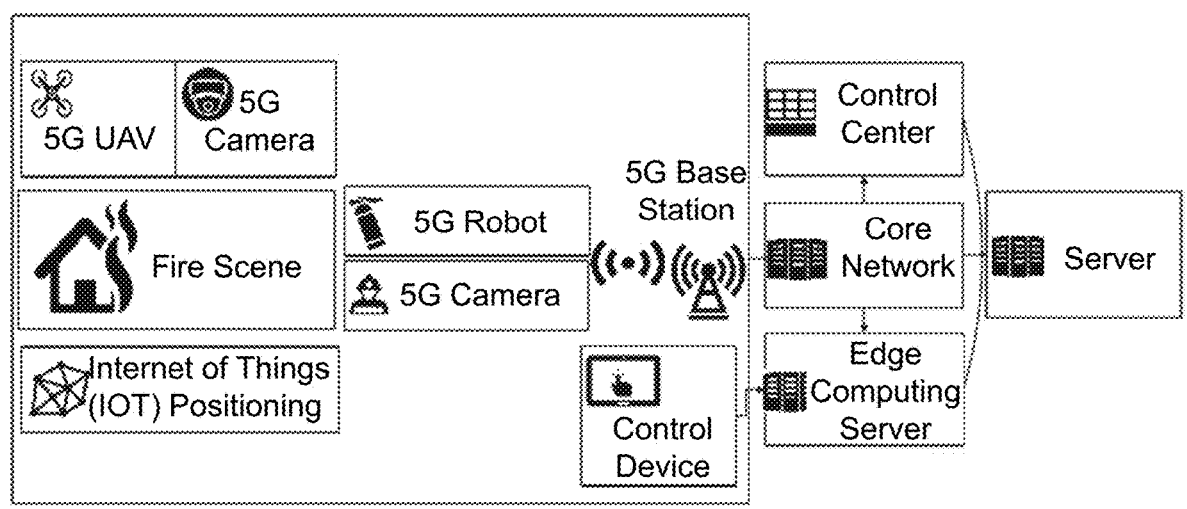
FIG. 12 is a schematic diagram illustrating an exemplary process for fire disaster control according to some embodiments of the present disclosure.

FIG. 12 is a schematic diagram illustrating an exemplary process for fire disaster control according to some embodiments of the present disclosure.

After an alert message associated with a fire disaster is obtained, a plurality of camera devices may capture image data associated with a fire scene (e.g., a target area). For example, a 5G UAV may fly to the fire scene to capture first image data associated with the fire scene based on a first shooting instruction sent by a control device. A 5G camera located in the fire scene may capture second image data associated with the fire scene based on a second shooting instruction sent by the control device. A 5G robot (e.g., a firefighting robot) may capture third image data (e.g., a 360-degree panoramic video) of the fire scene based on a third shooting instruction sent by the control device. A 5G camera carried by a user (e.g., a firefighter) may capture fourth image data associated with the surrounding environment of the user in the fire scene.

In some embodiments, each of the plurality of camera devices may be equipped with an Internet of Things (IoT) positioning device. A location of the each camera device may be determined based on positioning data transmitted from the IoT positioning device mounted on the each camera device.

In some embodiments, the image data (e.g., the first image data, the second image data, the third image data, the fourth image data) and the positioning data may be transmitted to the control device or a core network via a 5G base station. The control device may transmit the image data and/or the positioning data to an edge computing server via the 5G network. In some embodiments, the edge computing server may determine a plan (or an updated plan) for controlling the fire disaster based on the image data. In some embodiments, the edge computing server may determine locations of the plurality of camera devices based on the positioning data. The edge computing server may further transmit the plan (or the updated plan) and the locations of the plurality of camera devices to a control center via the 5G network.

In some embodiments, the image data (e.g., the first image data, the second image data, the third image data, the fourth image data) and the positioning data may be transmitted to a core network via the 5G base station. The core network may transmit the image data and/or the positioning data to the control center, the edge computing server, or a server via the 5G network. In some embodiments, the control center (or the server) may determine the plan (or the updated plan) for controlling the fire disaster based on the image data. In some embodiments, the control center (or the server) may determine the locations of the plurality of camera devices based on the positioning data.

Figure 13:
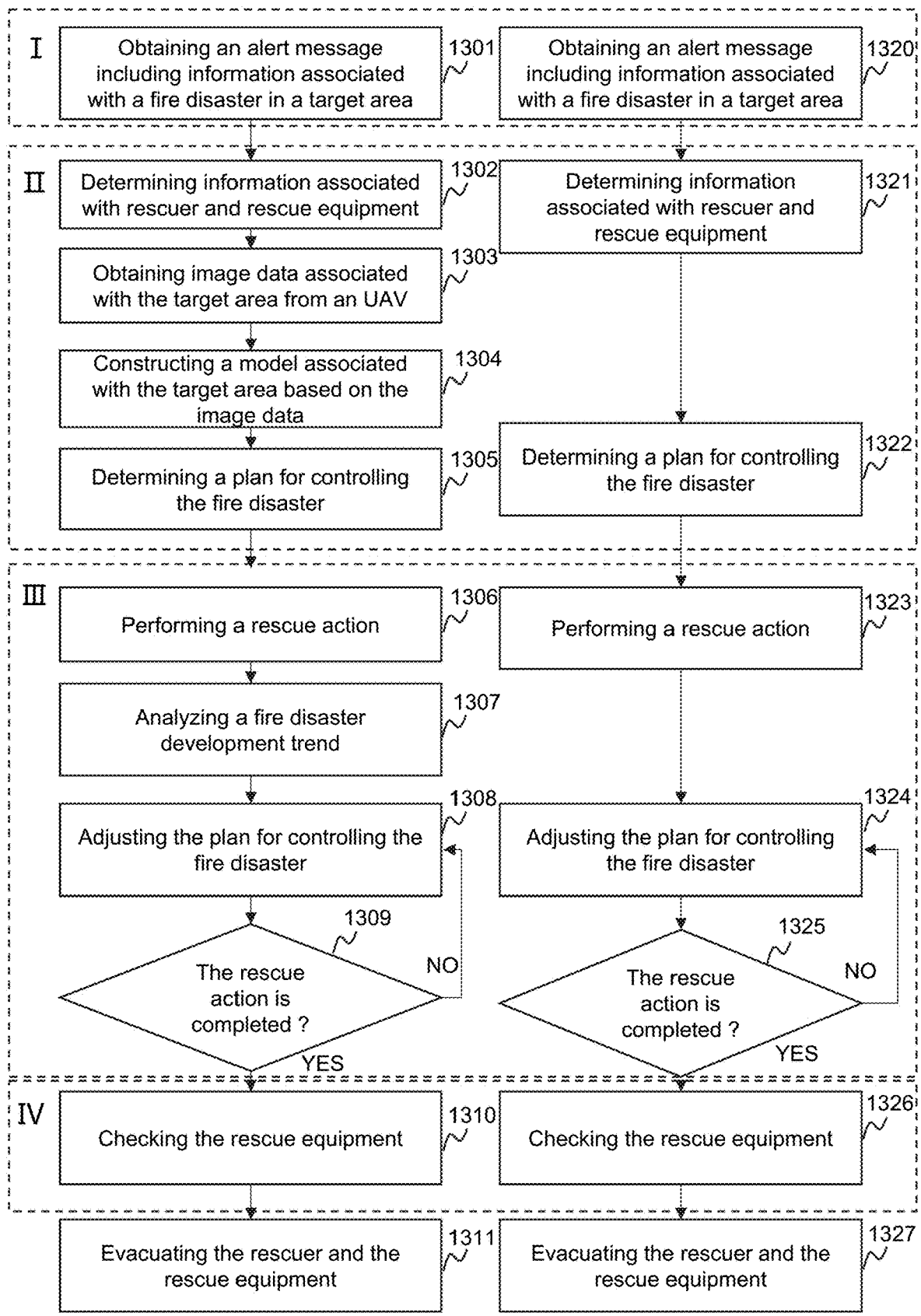
FIG. 13 is a flowchart illustrating an exemplary process for fire disaster control according to some embodiments of the present disclosure.

FIG. 13 is a flowchart illustrating an exemplary process for fire disaster control according to some embodiments of the present disclosure. In some embodiments, as illustrated in FIG. 13, the fire disaster control may include four sections: section 1 (e.g., operation 1301) may be an alarm obtaining process, section 2 (e.g., operations 1302 to 1305) may be a plan determination process, section 3 (e.g., operations 1306 to 1309) may be a rescue process, and section 4 (e.g., operation 1310) may be an equipment check process.

As illustrated in FIG. 13, operations 1301 to 1311 may describe a fire disaster control process according to some embodiments of the present disclosure.

In 1301, the control device 130 (e.g., the first obtaining module 410) or the processing engine 112 (e.g., the obtaining module 510) may obtain an alert message including information associated with a fire disaster in a target area. More descriptions of the obtaining of the alert message may be found elsewhere in the present disclosure (e.g., operation 610 in FIG. 6, and descriptions thereof).

In 1302, the processing engine 112 (e.g., the determination module 520) may determine information associated with rescuer and rescue equipment.

In some embodiments, after the alert message is obtained, the control device 130 may send a first shooting instruction to at least one camera device (e.g., the camera device 120) to return first image data associated with the target area. In some embodiments, the at least one camera device may be a surveillance camera located in the target area or an adjacent area. For example, the at least one camera device may be equipped with a global navigation satellite system (GNSS), and the control device 130 may obtain geographic coordinates of the at least one camera device via the GNSS. The control device 130 may send the first shooting instruction to the at least one camera device based on the geographic coordinates of the at least one camera device.

In response to the first shooting instruction, the at least one camera device may transmit the first image data associated with the target area to the processing engine 112 via the network 150 (e.g., a 5G network). For example, the first image data may be transmitted to the processing engine 112 in real-time by using a network slicing, a quality of service (QoS), and/or a big broadband of the 5G network. As used herein, a QoS may refer to a set of technologies that work on a network to guarantee its ability to run high-priority applications and traffic under limited network capacity dependably.

The processing engine 112 may determine the information associated with rescuer and rescue equipment in the fire disaster control (also referred to as a preliminary plan as described in operation 620) based on the first image data and information associated with the fire disaster. In some embodiments, the information associated with rescuer and rescue equipment may include a number (or count) of rescuers, a type of rescuer (e.g., different types of rescuers may perform different types of works), a number (or count) of rescue equipment, a type of rescue equipment, or the like, or any combination thereof, as described in connection with operation 620.

In 1303, the control device 130 (e.g., the first obtaining module 410) or the processing engine 112 (e.g., the obtaining module 510) may obtain image data associated with the target area from an unmanned aerial vehicle (UAV).

In some embodiments, the control device 130 may send a second shooting instruction to the UAV to capture second image data associated with the target area. The second image data may include third image data and fourth image data. For example, the UAV may generate the third image data by performing a panoramic shooting on the target area. As another example, the UAV may generate the fourth image data associated with at least one sub-area of a plurality of sub-areas in the target area by performing a fixed-point shooting on the target area. The UAV may transmit the second image data (e.g., the third image data, the fourth image data) to one or more components (e.g., the processing engine 112, the control device 130) of the disaster control system 100, an edge computing node (e.g., an edge computing processor), or a command center via the 5G network. For example, the second image data may be transmitted to the one or more components (e.g., the processing engine 112, the control device 130) of the disaster control system 100, the edge computing node (e.g., the edge computing processor), or the command center in real-time by using a network slicing, a quality of service (QoS), and/a big broadband of the 5G network.

In 1304, the processing engine 112 (e.g., the determination module 520) may construct a model associated with the target area based on the image data.

In some embodiments, the processing engine 112 may construct a map of the target area based on the second image data (e.g., the third image data, the fourth image data) as described elsewhere in the present disclosure (e.g., FIG. 6 and descriptions thereof).

In 1305, the processing engine 112 (e.g., the determination module 520) may determine a plan for controlling the fire disaster.

In some embodiments, the plan may include a first route for entering the target area, a second route for leaving the target area, a hydrant position calibration, a number (or count) of rescuers at different locations in the target area, or the like, or any combination thereof. In some embodiments, the processing engine 112 may determine the plan based on the information associated with the disaster and the second image data (e.g., the third image data, the fourth image data) captured by the UAV, as described elsewhere in the present disclosure (e.g., FIGS. 6, 8, and descriptions thereof).

Accordingly, the panoramic shooting and the fixed-point shooting of the UAV on the target area, and/or sensor data obtained by the at least one camera device may ensure that the acquisition of information associated with the target area is accurate and comprehensive. In addition, the plan may be determined by an edge computing node (e.g., an edge computing processor), which may ensure that the plan can be accurately determined before the rescuer arrives at a fire scene (i.e., the target area), the risk of the rescuer entering the fire scene to determine the plan may be avoided.

In some embodiments, the processing engine 112 may transmit the plan to the control device 130 for display via the network 150 (e.g., the 5G network). In some embodiments, the plan may be transmitted to the control device 130 in real-time by using a network slicing, a quality of service (QoS), and/or a big broadband of the 5G network.

In some embodiments, a user (e.g., a director) of the control device 130 may determine a target plan for controlling the fire disaster based on the plan determined by the processing engine 112.

In 1306, a rescue action may be performed.

In some embodiments, the control device 130 may send a third shooting instruction to the at least one camera device to capture fifth image data associated with the target area. For example, the UAV may perform a shooting on at least one sub-area of the plurality of sub-areas in the target area based on the third shooting instruction to generate sixth image data. The UAV may transmit the sixth image data to one or more components (e.g., the processing engine 112, the control device 130) of the disaster control system 100, an edge computing node (e.g., an edge computing processor), or the command center via the 5G network. For example, the UAV may compress (e.g., a shallow compression, a deep compression) the sixth image data and transmit compressed sixth image data to the one or more components (e.g., the processing engine 112, the control device 130) of the disaster control system 100, the edge computing node (e.g., an edge computing processor), or the command center via the 5G network.

As another example, a smart robot (e.g., a firefighting robot) may capture a 360-degree panoramic video (or a video of other angles, e.g., 270 degrees, 180 degrees) of the target area and/or a thermal imaging video based on the third shooting instruction to generate seventh image data. The smart robot may transmit the seventh image data to one or more components (e.g., the processing engine 112, the control device 130) of the disaster control system 100, an edge computing node (e.g., an edge computing processor), or the command center via the 5G network. For example, the smart robot may compress (e.g., a shallow compression, a deep compression) the seventh image data and transmit compressed seventh image data to the one or more components (e.g., the processing engine 112, the control device 130) of the disaster control system 100, the edge computing node (e.g., an edge computing processor), or the command center via the 5G network.

As still another example, a camera device carried by a user (e.g., a firefighter) may capture eighth image data associated with the surrounding environment of the user in the target area. In some embodiments, the camera device may be equipped with one or more sensors. The camera device may transmit the eighth image data and/or sensor data obtained by the one or more sensors to one or more components (e.g., the processing engine 112, the control device 130) of the disaster control system 100, an edge computing node (e.g., an edge computing processor), or the command center via the 5G network.

In some embodiments, the sixth image data, the seventh image data, and the eighth image data may be transmitted to the one or more components (e.g., the processing engine 112, the control device 130) of the disaster control system 100, the edge computing node (e.g., an edge computing processor), or the command center in real time by using a network slicing, a quality of service (QOS), and/or a big broadband of the 5G network.

In 1307, the processing engine 112 (e.g., the determination module 520) may analyze a fire disaster development trend.

In some embodiments, the processing engine 112 may analyze the fire disaster development trend based on at least one of the sixth image data, the seventh image data, or the eighth image data.

In 1308, the processing engine 112 (e.g., the determination module 520) may adjust the plan for controlling the fire disaster.

In some embodiments, the processing engine 112 may determine an updated plan based on the sixth image data, the seventh image data, the eighth image data, and the fire disaster development trend.

According to some embodiments of the present disclosure, in the rescue process, the 5G network may provide a transmission control model with a base station as a center, which may break a line-of-sight transmission limitation and reduce a number (or count) of nodes in the control and data transmission process. Therefore, time delay in the data transmission process may be reduced, the efficiency of data synchronization may be improved, and the data may be transmitted in real-time. In addition, control rights of the at least one camera (e.g., the unmanned aerial vehicle) may be switched between local (e.g., a fire scene) and remote (e.g., a command center, a control device in the command center) by using the 5G network. The safety of the firefighters may be ensured, and the reliability of the control and data transmission may be improved. The remote control of the unmanned aerial vehicle may be achieved by the 5G network, which may reduce the number of nodes in the control and data transmission process, the time delay in the data transmission process may be reduced, and the image data may be transmitted to a 5G edge node in real-time.

Furthermore, in some embodiments, the 5G image transmission between the at least one camera device (e.g., the UAV, the smart robot) and the control device (e.g., the control device 130) may be realized by performing a shallow compression operation on the image data captured by the at least one camera device, which may reduce the compression time. The user (e.g., a director) of the control device 130 may obtain the image data in real-time, thereby realizing a real-time control of the at least one camera device. In some embodiments, the 5G image transmission between the at least one camera device (e.g., the UAV, the smart robot) and the control device (e.g., the control device 130) may be realized by performing a deep compression operation on the image data captured by the at least one camera device, which may achieve a relatively low code rate and a relatively high reliability transmission between the at least one camera device and the control device. In addition, a 5G transmission link may be added in a mesh network. When the mesh network is a failure, a 5G backup transmission may ensure the stability of the data transmission.

In 1309, the processing engine 112 (e.g., the determination module 520) or a user of the disaster control system 100 may determine whether the rescue action is completed.

In response to a determination that the rescue action is not completed, the plan for controlling the fire disaster may further be adjusted as described in connection with operation 1308.

In response to a determination that the rescue action is completed, in 1310, the control device 130 or the processing engine 112 (e.g., the determination module 520) may check the rescue equipment.

In some embodiments, the processing engine 112 may determine a location of the rescue equipment according to an Internet of Things (IoT) positioning (e.g., a narrow band IoT) technology and/or a global navigation satellite system (GNSS) technology. For example, an IoT positioning device may be mounted in the rescue equipment. The processing engine 112 may determine the location of the rescue equipment based on signals transmitted from the IoT positioning device mounted in the rescue equipment.

In 1312, the rescuer and the rescue equipment may be evacuated. The fire disaster control may end.

As illustrated in FIG. 13, operations 1320 to 1327 may describe a traditional fire disaster control process.

In 1320, an alert message, including information associated with a fire disaster in a target area may be obtained.

In 1321, information associated with rescuer and rescue equipment may be determined. The information associated with rescuer and rescue equipment may be determined based on the alert message, which may be inaccurate.

In 1322, a plan for controlling the fire disaster may be determined.

The rescuer may need to enter the target area, and then determine the plan for controlling the fire disaster. The plan may be determined late and the safety of the rescuer may not be ensured.

In 1323, a rescue action may be performed.

One or more camera devices (e.g., a smart robot) may capture image data associated with the target area. The one or more camera devices may transmit the image data to a control device via a mesh network and/or a 4G network. The cost of data transmission between the smart robot and the control device may be high, and the data transmission distance may be limited. The broadband of the mesh network may be insufficient, and the stability of data transmission between a camera device carried by a rescuer and the control device may be poor. In addition, the broadband of the 4G network may also be insufficient.

In 1324, the plan for controlling the fire disaster may be adjusted. The rescuer (e.g., a firefighter) may need to enter the target area and then adjust the plan for controlling the fire disaster. The safety of the rescuer may not be ensured.

In 1325, a determination may be made as to whether the rescue action is completed. In response to a determination that the rescue action is not completed, the plan for controlling the fire disaster may further be adjusted as described in connection with operation 1324.

In response to a determination that the rescue action is completed, in 1326, the rescue equipment may be checked. The rescuer (e.g., a firefighter) may check the rescue equipment manually, which may be time consuming and laborious.

In 1327, the rescuer and the rescue equipment may be evacuated. The fire disaster control may end.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for disaster control implemented on a control device, the method comprising:
   obtaining an alert message including information associated with a disaster in a target area;
   sending a first shooting instruction to at least one camera device to capture first image data associated with the target area, wherein the first shooting instruction includes a first instruction and a second instruction, the first image data includes second image data and third image data, the at least one camera device includes a first camera device and a second camera device, and the sending the first shooting instruction to the at least one camera device to capture the first image data associated with the target area comprises:
   sending, to the first camera device, the first instruction to direct the first camera device to the target area and an adjacent area to capture the second image data; and
   sending, to the second camera device, the second instruction to capture the third image data, wherein the second camera device is located in the target area or the adjacent area, and the third image data is associated with the target area and the adjacent area; and
   obtaining a plan for controlling the disaster from at least one processor, wherein the first image data is transmitted to the at least one processor through a communication network, and wherein the plan is determined, by the at least one processor, based on the information associated with the disaster and the first image data, wherein the second image data includes fifth image data and sixth image data, the target area includes a plurality of sub-areas, and the method further comprises:
   in response to the first instruction,
   generating, by the first camera device, the fifth image data by performing a panoramic shooting on the target area;
   generating, by the first camera device, the sixth image data associated with at least one sub-area of the plurality of sub-areas; and
   performing, by the first camera device, a shallow compression operation on the first image data to generate compressed first image data.

2. The method of claim 1, wherein the fifth image data is used to construct a map of the target area, and the method further comprises:
   transmitting, by the first camera device, the compressed first image data to the control device to direct the control device to display the compressed first image data; and
   prior to sending the first instruction to the first camera device:
   sending, to a third camera device, a second shooting instruction to direct the third camera device to return fourth image data associated with the target area, wherein the fourth images data is obtained by the third camera device within a predetermined time period, and wherein the third camera device is located in the target area or the adjacent area.

3. The method of claim 1, wherein the method further comprises:
   in response to obtaining the plan for controlling the disaster from the at least one processor,
   sending a third shooting instruction to the at least one camera device to capture seventh image data associated with at least one sub-area of the target area, wherein the seventh image data includes eighth image data, ninth image data, and tenth image data, the at least one camera device further includes a fourth camera device and a fifth camera device, and the sending the third shooting instruction to the at least one camera device to capture the seventh image data comprises:
   sending, to the first camera device, the third shooting instruction to capture the eighth image data associated with the target area;
   sending, to the fourth camera device, the third shooting instruction to capture the ninth image data associated with the target area; and
   sending, to the fifth camera device associated with a user, the third shooting instruction to capture the tenth image data associated with the target area.

4. The method of claim 3, wherein the fourth camera device is a smart robot with a camera, and the method further comprises:
   obtaining an updated plan for controlling the disaster from the at least one processor, wherein the seventh image data is transmitted to the at least one processor, and the updated plan is determined, by the at least one processor, based on the first image data and the seventh image data.

5. The method of claim 3, further comprising:
   in response to sending the third shooting instruction to the first camera device,
   performing, by the first camera device, a shallow compression operation on the eighth image data to generate compressed eighth image data; and
   transmitting, by the first camera device, the compressed eighth image data to the control device, and wherein the compressed eighth image data is displayed on the control device.

6. The method of claim 3, further comprising:
   in response to sending the third shooting instruction to the fourth camera device,
   performing, by the fourth camera device, a shallow compression operation on the ninth image data to generate compressed ninth image data; and transmitting, by the fourth camera device, the compressed ninth image data to the control device, and wherein the compressed ninth image data is displayed on the control device.

7. The method of claim 3, further comprising:
obtaining sound information associated with an explosion from the fifth camera device associated with the user; and
obtaining an explosion location from the at least one processor, wherein the explosion location is determined, by the at least one processor, based on the sound information and a location of the fifth camera device.

8. The method of claim 1, wherein the obtaining the plan for controlling the disaster from the at least one processor comprises:
obtaining a first route for entering the target area from the at least one processor; and
obtaining a second route for leaving the target area from the at least one processor.

9. The method of claim 1, further comprising:
determining a location of at least one equipment associated with the disaster according to an Internet of Things (IoT) positioning technology.

10. The method of claim 9, wherein the at least one equipment includes at least one of the at least one camera device, or an equipment used to control the disaster.

11. The method of claim 1, wherein the communication network between at least two devices of the control device, the at least one processor, and the at least one camera device is a 5G network.

12. The method of claim 1, further comprising:
transmitting, by the at least one camera device, the first image data to the control device using a 5G network.

13. The method of claim 12, wherein the transmitting the first image data to the control device comprises:
performing, by the at least one camera device, a deep compression operation on the first image data to generate compressed first image data; and
transmitting, by the at least one camera device, the compressed first image data to the control device.

14. The method of claim 1, further comprising:
transmitting, by the at least one processor, the plan to the control device using a 5G network.

15. The method of claim 1, wherein the at least one camera device includes a 5G camera device.

16. A method for disaster control implemented on a computing device having at least one processor and at least one storage device, the method comprising:
obtaining first image data associated with a target area from at least one camera device, wherein the first image data is captured based on a first shooting instruction, the first shooting instruction is generated based on an alert message including first information associated with a disaster in the target area, the first shooting instruction includes a first instruction and a second instruction, the first image data includes second image data and third image data, the at least one camera device includes a first camera device and a second camera device, and the obtaining the first image data associated with the target area from the at least one camera device comprises:
sending, to the first camera device, the first instruction to direct the first camera device to the target area and an adjacent area to capture the second image data; and
sending, to the second camera device, the second instruction to capture the third image data, wherein the second camera device is located in the target area or the adjacent area, and the third image data is associated with the target area and the adjacent area; and
determining, based on the first image data and the first information associated with the disaster in the target area, a plan for controlling the disaster, wherein the second image data includes fifth image data and sixth image data, the target area includes a plurality of sub-areas, and the method further comprises:
in response to the first instruction,
generating, by the first camera device, the fifth image data by performing a panoramic shooting on the target area;
generating, by the first camera device, the sixth image data associated with at least one sub-area of the plurality of sub-areas; and
performing, by the first camera device, a shallow compression operation on the first image data to generate compressed first image data.

17. A system for disaster control, comprising:
at least one storage device storing a set of instructions; and
at least one processor in communication with the at least one storage device, when executing the stored set of instructions, the at least one processor causes the system to perform operations including:
obtaining an alert message including information associated with a disaster in a target area;
sending a first shooting instruction to at least one camera device to capture first image data associated with the target area, wherein the first shooting instruction includes a first instruction and a second instruction, the first image data includes second image data and third image data, the at least one camera device includes a first camera device and a second camera device, and the sending the first shooting instruction to the at least one camera device to capture the first image data associated with the target area comprises:
sending, to the first camera device, the first instruction to direct the first camera device to the target area and an adjacent area to capture the second image data; and
sending, to the second camera device, the second instruction to capture the third image data, wherein the second camera device is located in the target area or the adjacent area, and the third image data is associated with the target area and the adjacent area; and
obtaining a plan for controlling the disaster from at least one processor, wherein the first image data is transmitted to the at least one processor through a communication network, and wherein the plan is determined, by the at least one processor, based on the information associated with the disaster and the first image data, wherein the second image data includes fifth image data and sixth image data, the target area includes a plurality of sub-areas, and the at least one processor causes the system to further perform operations including:
in response to the first instruction,
generating, by the first camera device, the fifth image data by performing a panoramic shooting on the target area;
generating, by the first camera device, the sixth image data associated with at least one sub-area of the plurality of sub-areas; and performing, by the first camera device, a shallow compression operation on the first image data to generate compressed first image data.

* * * * *